(12) United States Patent
Lee

(10) Patent No.: US 12,495,957 B2
(45) Date of Patent: Dec. 16, 2025

(54) ORAL IMAGE PROCESSING METHOD, ORAL DIAGNOSTIC DEVICE FOR PERFORMING OPERATION ACCORDING THERETO, AND COMPUTER-READABLE STORAGE MEDIUM IN WHICH PROGRAM FOR PERFORMING METHOD IS STORED

(71) Applicant: MEDIT CORP., Seoul (KR)

(72) Inventor: Dong Hoon Lee, Seoul (KR)

(73) Assignee: MEDIT CORP., Seoul (KR)

( * ) Notice: Subject to any disclaimer, the term of this patent is extended or adjusted under 35 U.S.C. 154(b) by 463 days.

(21) Appl. No.: 17/924,448

(22) PCT Filed: May 28, 2021

(86) PCT No.: PCT/KR2021/006691
§ 371 (c)(1),
(2) Date: Nov. 10, 2022

(87) PCT Pub. No.: WO2021/242050
PCT Pub. Date: Dec. 2, 2021

(65) Prior Publication Data
US 2023/0337898 A1    Oct. 26, 2023

(30) Foreign Application Priority Data
May 28, 2020    (KR) .......................... 10-2020-0064618

(51) Int. Cl.
*A61B 1/00* (2006.01)
*A61C 7/00* (2006.01)
(Continued)

(52) U.S. Cl.
CPC ........ *A61B 1/00172* (2013.01); *A61B 1/0005* (2013.01); *G06T 7/0012* (2013.01); *G06T 7/251* (2017.01); *G06T 2207/30036* (2013.01)

(58) Field of Classification Search
None
See application file for complete search history.

(56) References Cited

U.S. PATENT DOCUMENTS

| 8,562,338 B2 | 10/2013 | Kitching et al. |
| 9,529,970 B2 | 12/2016 | Andreiko |
| (Continued) | | |

FOREIGN PATENT DOCUMENTS

| JP | 2009-528145 A | 8/2009 |
| JP | 2013-126578 A | 6/2013 |
| (Continued) | | |

OTHER PUBLICATIONS

Korean Office Action for 10-2020-0064618, dated Jul. 28, 2021.
(Continued)

*Primary Examiner* — Beniyam Menberu
(74) *Attorney, Agent, or Firm* — Sughrue Mion, PLLC

(57) ABSTRACT

An intraoral image processing method according to an embodiment includes: acquiring a first intraoral image generated by scanning, at a first time point, at least one tooth to which at least one orthodontic device is attached; acquiring a second intraoral image generated by scanning, at a second time point subsequent to first time point, at least one tooth to which at least one orthodontic device is attached; extracting an image of at least one orthodontic device from each of first intraoral image and second intraoral image; obtaining movement information of an orthodontic device based on image of at least one orthodontic device extracted from first intraoral image and an image of at least one orthodontic device extracted from second intraoral image; and generating a third intraoral image representing a movement of at least one orthodontic device from first time point to second time point based on movement information.

18 Claims, 21 Drawing Sheets

(51) Int. Cl.
 *A61C 7/12* (2006.01)
 *G06T 7/00* (2017.01)
 *G06T 7/246* (2017.01)

(56) References Cited

U.S. PATENT DOCUMENTS

| | | | |
|---|---|---|---|
| 2003/0027098 A1* | 2/2003 | Manemann | G16H 20/40 |
| | | | 433/24 |
| 2005/0192835 A1 | 9/2005 | Kuo et al. | |
| 2006/0147872 A1 | 7/2006 | Andreiko | |
| 2008/0124681 A1 | 5/2008 | Cha | |
| 2010/0260405 A1* | 10/2010 | Cinader, Jr. | A61C 7/00 |
| | | | 382/128 |
| 2016/0220200 A1* | 8/2016 | Sandholm | A61B 5/4848 |
| 2018/0168781 A1* | 6/2018 | Kopelman | G16H 30/20 |
| 2019/0269482 A1* | 9/2019 | Shanjani | A61B 90/37 |
| 2020/0100871 A1 | 4/2020 | Wang et al. | |
| 2021/0045637 A1 | 2/2021 | Chang et al. | |
| 2021/0321872 A1* | 10/2021 | Saphier | A61B 5/7475 |
| 2023/0274438 A1* | 8/2023 | Chang | G06T 7/0016 |
| | | | 382/128 |

FOREIGN PATENT DOCUMENTS

| | | | |
|---|---|---|---|
| KR | 10-2017-0127950 A | 11/2017 | |
| KR | 20180024079 * | 3/2018 | A61B 5/00 |
| KR | 10-1874547 B1 | 7/2018 | |
| KR | 10-2019-0077849 A | 7/2019 | |
| KR | 10-2020-0046843 A | 5/2020 | |

OTHER PUBLICATIONS

Korean Office Action for 10-2020-0064618, dated Nov. 25, 2021.
International Search Report for PCT/KR2021/006691, dated Sep. 2, 2021.
Extended European Search Report issued May 14, 2024 in Application No. 21813893.1.

* cited by examiner

ORAL IMAGE PROCESSING METHOD, ORAL DIAGNOSTIC DEVICE FOR PERFORMING OPERATION ACCORDING THERETO, AND COMPUTER-READABLE STORAGE MEDIUM IN WHICH PROGRAM FOR PERFORMING METHOD IS STORED

TECHNICAL FIELD

The disclosed embodiment relates to a method for processing an intraoral image, an intraoral diagnostic device for performing an operation according to the method, and a computer-readable storage medium storing a program for performing the method.

Specifically, the disclosed embodiments relate to a method of processing an intraoral image of at least one tooth to which a bracket for orthodontic treatment is attached, an intraoral diagnostic device performing an operation according to the method, and a computer-readable storage medium storing a program for performing the method.

BACKGROUND ART

There are various dental treatments for patients. Orthodontic treatment is n example of a dental treatment.

For orthodontic treatment, the patient has one or more bracket installed on a tooth or teeth, and a wire is connected to at least one of the installed brackets. By using the bracket connected to the wire, it is possible to correct the position of the tooth (teeth) by moving the tooth or at least one tooth to a correct position.

Such orthodontic treatment usually takes a lot of time, more than one year. Also, during the orthodontic treatment period, a dentist has to periodically check whether the patient's teeth become orthodontic to correspond to a correct position. In addition, in consideration of the orthodontic progress, the dentist may adjust the distance between the brackets using a wire so that the tooth or teeth may be moved to a target orthodontic position.

Accordingly, there is a need for a method and device for allowing a dentist to quickly and accurately determine the orthodontic progress during orthodontic treatment.

DESCRIPTION OF EMBODIMENTS

Technical Problem

The disclosed embodiment provides a method of processing an intraoral image so that a user may intuitively grasp the progress of the correction, an intraoral diagnostic device that performs an operation according thereto, and a computer-readable storage medium in which a program for performing the method is stored.

Specifically, the disclosed embodiment provides an intraoral image processing method that provides an intraoral image showing the movement of the bracket so that the orthodontic progress may be quickly and easily grasped, an intraoral diagnostic device that performs the action accordingly, and a computer-readable storage medium in which a program for performing the method is stored.

Solution to Problem

An intraoral image processing method according to the disclosed embodiment includes: acquiring a first intraoral image generated by scanning at least one tooth to which at least one orthodontic device is attached at a first time point; acquiring a second intraoral image generated by scanning the at least one tooth to which the at least one orthodontic device is attached at a second time point subsequent to the first time point; extracting at least one orthodontic device from each of the first intraoral image and the second intraoral image; obtaining movement information of an orthodontic device based on at least one orthodontic device extracted from the first intraoral image and at least one orthodontic device extracted from the second intraoral image; and generating a third intraoral image representing movement of at least one orthodontic device from the first time point to the second time point based on the movement information.

In addition, the third intraoral image may be an intraoral image in which information indicating at least one of a movement distance, movement direction, position difference, movement time, and movement speed corresponding to movement of each of the at least one orthodontic device from the first time point to the second time point is displayed.

Also, the third intraoral image may be an intraoral image in which the at least one orthodontic device extracted from the first intraoral image and the at least one orthodontic device extracted from the second intraoral image are displayed to be distinguished from each other based on the movement information.

Moreover, the third intraoral image may be an intraoral image in which the at least one orthodontic device extracted from the first intraoral image and the at least one orthodontic device extracted from the second intraoral image are displayed to be distinguished from each other using at least one of different colors, different transparency, different patterns, different symbols, different shapes, and different text.

In addition, the third intraoral image may be an image generated by overlapping the at least one orthodontic device extracted from the first intraoral image on the second intraoral image.

Also, the third intraoral image may be an image in which a final target position of the at least one orthodontic device is displayed.

In addition, the processor may generate information for guiding a final target position of the at least one tooth to be corrected by the at least one orthodontic device.

Moreover, the extracting of the at least one orthodontic device may include: inputting each of the first intraoral image and the second intraoral image into a neural network trained to extract an orthodontic device; and obtaining the image of at least one orthodontic device corresponding to the first intraoral image and at least one orthodontic device corresponding to the second intraoral image, which are output from the neural network.

In addition, the intraoral image processing method according to the disclosed embodiment may further include acquiring the neural network trained to extract an orthodontic device based on a plurality of intraoral images including at least one tooth to which the orthodontic device is attached.

In addition, the neural network may be a deep neural network (DNN) that performs a convolution operation to separate an orthodontic device by executing pixel-wise segmentation from an intraoral image.

Also, the obtaining of the movement information of the orthodontic device may include: replacing each of at least one bracket extracted from the first intraoral image and at least one bracket extracted from the second intraoral image with a library corresponding to the extracted bracket; and acquiring movement information of the bracket based on the replaced library.

Also, the intraoral image processing method according to the disclosed embodiment may further include displaying a user interface screen including the third intraoral image.

Additionally, the orthodontic device may include at least one of a bracket, an attachment, an orthodontic screw, a lingual orthodontic device, and a removable orthodontic retention device.

An intraoral diagnostic device according to the disclosed embodiment includes a processor for processing an intraoral image. The processor, by executing at least one instruction, obtains a first intraoral image generated by scanning at least one tooth to which at least one orthodontic device is attached at a first time point, acquiring a second intraoral image generated by scanning the at least one tooth to which the at least one orthodontic device is attached at a second time point subsequent to the first time point, extracting at least one orthodontic device from each of the first intraoral image and the second intraoral image, obtaining movement information of an orthodontic device based on at least one orthodontic device extracted from the first intraoral image and at least one orthodontic device extracted from the second intraoral image, and generating a third intraoral image representing movement of at least one orthodontic device during a time from the first time point to the second time point based on the movement information.

A computer-readable storage medium according to the disclosed embodiment is a non-transitory computer-readable storage medium in which a program including at least one instruction for performing a method of processing an intraoral image is recorded. Here, the intraoral image processing method includes: acquiring a first intraoral image generated by scanning at least one tooth to which at least one orthodontic device is attached at a first time point; acquiring a second intraoral image generated by scanning the at least one tooth to which the at least one orthodontic device is attached at a second time point subsequent to the first time point; extracting at least one orthodontic device from each of the first intraoral image and the second intraoral image; obtaining movement information of an orthodontic device based on at least one orthodontic device extracted from the first intraoral image and at least one orthodontic device extracted from the second intraoral image; and generating a third intraoral image representing movement of at least one orthodontic device from the first time point to the second time point based on the movement information.

A program product according to the disclosed embodiment is a program product including a storage medium in which a program including at least one instruction for performing an intraoral image processing method is recorded. Here, the intraoral image processing method includes: acquiring a first intraoral image generated by scanning at least one tooth to which at least one orthodontic device is attached at a first time point; acquiring a second intraoral image generated by scanning the at least one tooth to which the at least one orthodontic device is attached at a second time point subsequent to the first time point; extracting at least one orthodontic device from each of the first intraoral image and the second intraoral image; obtaining movement information of an orthodontic device based on at least one orthodontic device extracted from the first intraoral image and at least one orthodontic device extracted from the second intraoral image; and generating a third intraoral image representing movement of at least one orthodontic device from the first time point to the second time point based on the movement information.

Advantageous Effects of Disclosure

A method for processing an intraoral image according to the disclosed embodiments, an intraoral diagnostic device for performing an operation according to the method, and a computer-readable storage medium storing a program for performing the method may provide an intraoral image for intuitively determining the calibration history of a plurality of different time points. Accordingly, a user may easily and quickly determine the history of orthodontic treatment and refer to the history of orthodontic treatment for following treatment.

BRIEF DESCRIPTION OF DRAWINGS

The inventive concept may be easily understood by the following detailed description and combination of the accompanying drawings, in which reference numerals refer to structural elements.

MODE OF DISCLOSURE

Figure 1:
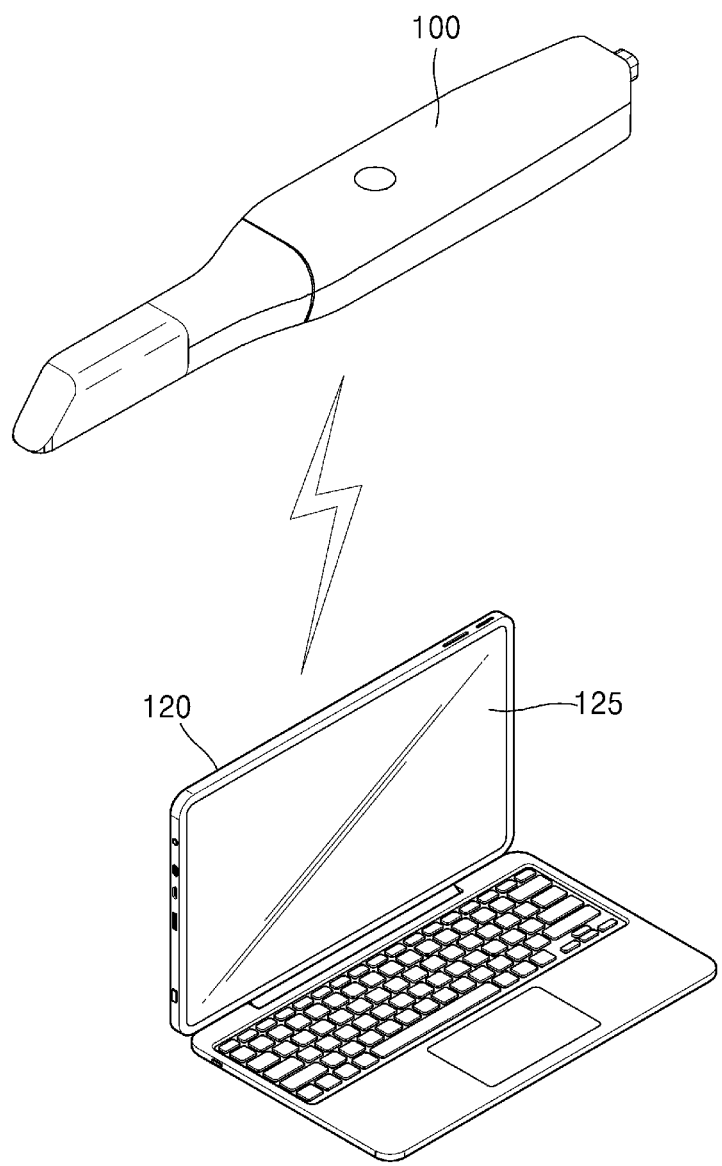
FIG. 1 is a view for explaining an intraoral diagnostic device according to the disclosed embodiment.

This specification clarifies the scope of the inventive concept, explains the principles of the inventive concept, and discloses embodiments so that those of ordinary skill in the art to which the inventive concept pertains may practice the inventive concept. The disclosed embodiments may be implemented in various forms.

Like reference numerals refer to like elements throughout the specification. This specification does not describe all elements of the embodiments, and general content in the technical field to which the inventive concept pertains or content that overlaps among the embodiments is omitted. As used herein, the term "part" or "portion" may be implemented in software or hardware, and according to embodiments, a plurality of "units" may be implemented as one unit or element, or one "unit" may include a plurality of elements. Hereinafter, the working principle and embodiments of the inventive concept will be described with reference to the accompanying drawings.

In the present specification, the image may include at least one tooth or an image representing an intraoral cavity including at least one tooth (hereinafter, "intraoral image").

Also, in the present specification, an image may be a two-dimensional image of an object or a three-dimensional model or three-dimensional image representing the object three-dimensionally. Also, in the present specification, an image may refer to data necessary to represent an object in two or three dimensions, for example, raw data obtained from at least one image sensor. In particular, raw data is data obtained to generate an intraoral image and may be data (e.g., three-dimensional data) obtained from at least one image sensor included in an intraoral scanner when scanning the intraoral cavity of a patient, which is an object, using the intraoral scanner.

In the present specification, an 'object' may include teeth, gingiva, at least a partial region of the intraoral cavity, and/or artificial structures (e.g., orthodontic devices, implants, artificial teeth, orthodontic aids inserted into the mouth, etc.) that may be inserted into the intraoral cavity. Here, the orthodontic device may include at least one of a bracket, an attachment, an orthodontic screw, a lingual orthodontic device, and a removable orthodontic maintenance device.

Hereinafter, embodiments will be described in detail with reference to the drawings.

FIG. 1 is a view for explaining an intraoral diagnostic device according to the disclosed embodiment.

Referring to FIG. 1, an intraoral scanner 100 is a medical device for acquiring an intraoral image.

Specifically, the intraoral scanner 100 may be a device for generating a three-dimensional model of the intraoral cavity including at least one tooth by being inserted into the intraoral cavity and scanning teeth in a non-contact manner. In addition, the intraoral scanner 100 may have a form that may be drawn in and out of the intraoral cavity, and scans the inside of the patient's intraoral cavity using at least one image sensor (e.g., an optical camera, etc.). The intraoral scanner 100 may acquire surface information about an object as raw data to image the surface of at least one of the teeth, gingiva, and artificial structures (e.g., orthodontic devices including brackets and wires, implants, artificial teeth, orthodontic aids inserted into the intraoral cavity, etc.) insertable in the intraoral cavity, which are objects.

The image data obtained from the intraoral scanner 100 may be transmitted to the intraoral diagnostic device 120 connected through a wired or wireless communication network.

The intraoral diagnostic device 120 may be any electronic device capable of being connected to the intraoral scanner 100 through a wired or wireless communication network, receiving data obtained by scanning the intraoral cavity from the intraoral scanner 100 and generating, processing, displaying, and/or transmitting an intraoral image based on the received data.

The intraoral diagnostic device 120 may generate at least one of information necessary for intraoral diagnosis and an intraoral image based on the data received from the intraoral scanner 100, and display the generated information and the image through the display 125.

The intraoral diagnostic device 120 may be a computing device such as a smart phone, a laptop computer, a desktop computer, a PDA, or a tablet PC, but is not limited thereto.

Also, the intraoral diagnostic device 120 may exist in the form of a server (or server device) for processing an intraoral image.

In addition, the intraoral scanner 100 may transmit raw data obtained through the intraoral scan to the intraoral diagnostic device 120 as it is. In this case, the intraoral diagnostic device 120 may generate a three-dimensional intraoral image representing the intraoral cavity in three dimensions based on the received raw data. In addition, the 'three-dimensional intraoral image' may be generated by modeling the internal structure of the intraoral cavity in three dimensions based on the received raw data, so it is called a 'three-dimensional intraoral model' or a 'three-dimensional intraoral image'. Hereinafter, a model or image representing the intraoral cavity in two or three dimensions is collectively referred to as an 'intraoral image'.

Further, the intraoral diagnostic device 120 may analyze, process, display and/or transmit the generated intraoral image.

As another example, the intraoral scanner 100 may acquire raw data through an intraoral scan, process the obtained raw data to generate an image corresponding to the intraoral cavity, which is an object, and transmit the image to the intraoral diagnostic device 120. In this case, the intraoral diagnostic device 120 may analyze, process, display and/or transmit the received image.

In the disclosed embodiment, the intraoral diagnostic device 120 is an electronic device capable of generating and displaying an intraoral image three-dimensionally representing an intraoral cavity including at least one tooth to which a bracket is attached for orthodontic treatment and will be described in detail with reference to FIG. 20.

Figure 2:
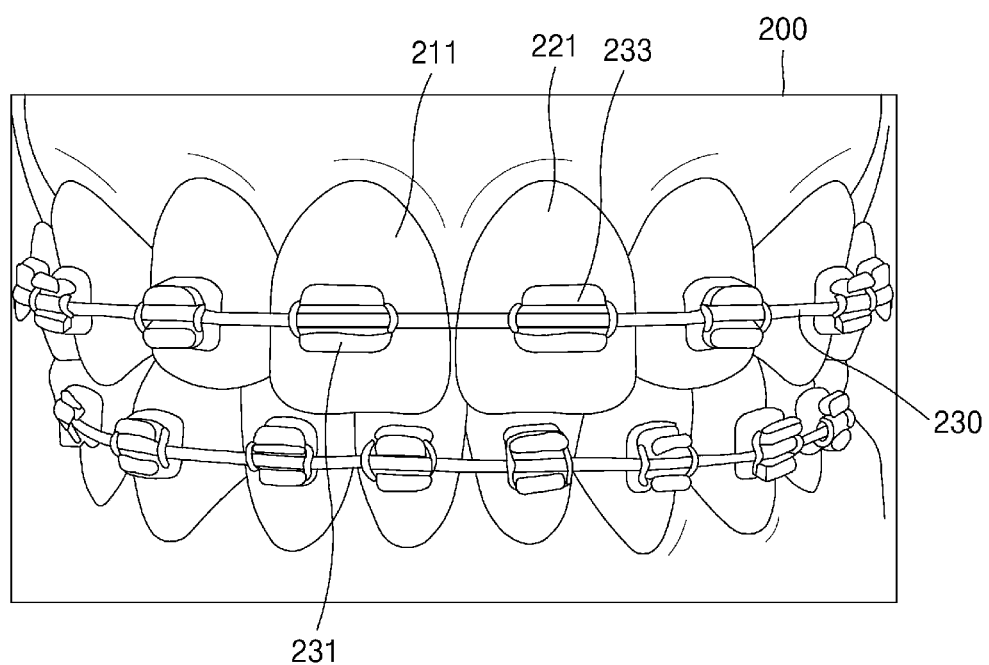
FIG. 2 is a view showing an intraoral image obtained by scanning at least one tooth or teeth to which a bracket is attached.

FIG. 2 is a view showing an intraoral image obtained by scanning at least one tooth or teeth to which a bracket is attached.

For example, a tooth to which a bracket is attached may be scanned using the intraoral scanner 100 described with reference to FIG. 1. In addition, the intraoral diagnostic device 120 may generate an intraoral image 200 representing a tooth to which a bracket is attached, based on data obtained from the intraoral scanner 100.

The intraoral scanner 100 may acquire only surface information about an object. Accordingly, when the intraoral scanner 100 scans a tooth on which a bracket is installed, information indicating the surface of the tooth to which the bracket is attached is acquired as 3D data. In addition, the intraoral diagnostic device 120 may generate the intraoral image 200 based on the three-dimensional data obtained from the intraoral scanner 100.

Since the intraoral image 200 can include an image of the entire surface of the patient's intraoral cavity, the intraoral image 200 can include an image of an orthodontic device attached to teeth (e.g., 211 and 221), for example, brackets 231 and 233, and wire 230 connecting the brackets 231 and 233 together.

In orthodontic treatment, a dentist is supposed to accurately understand a patient's orthodontic process or orthodontic history, so that future orthodontic treatment may be accurately performed. However, in understanding the orthodontic history with reference to the intraoral image 200, it is difficult to clearly understand the movement of the teeth due to the brackets attached to the teeth.

Therefore, in the disclosed embodiment, by providing an intraoral image intuitively indicating the movement of the bracket for a preset time, a user such as a dentist may easily proceed with orthodontic treatment.

Figure 3:
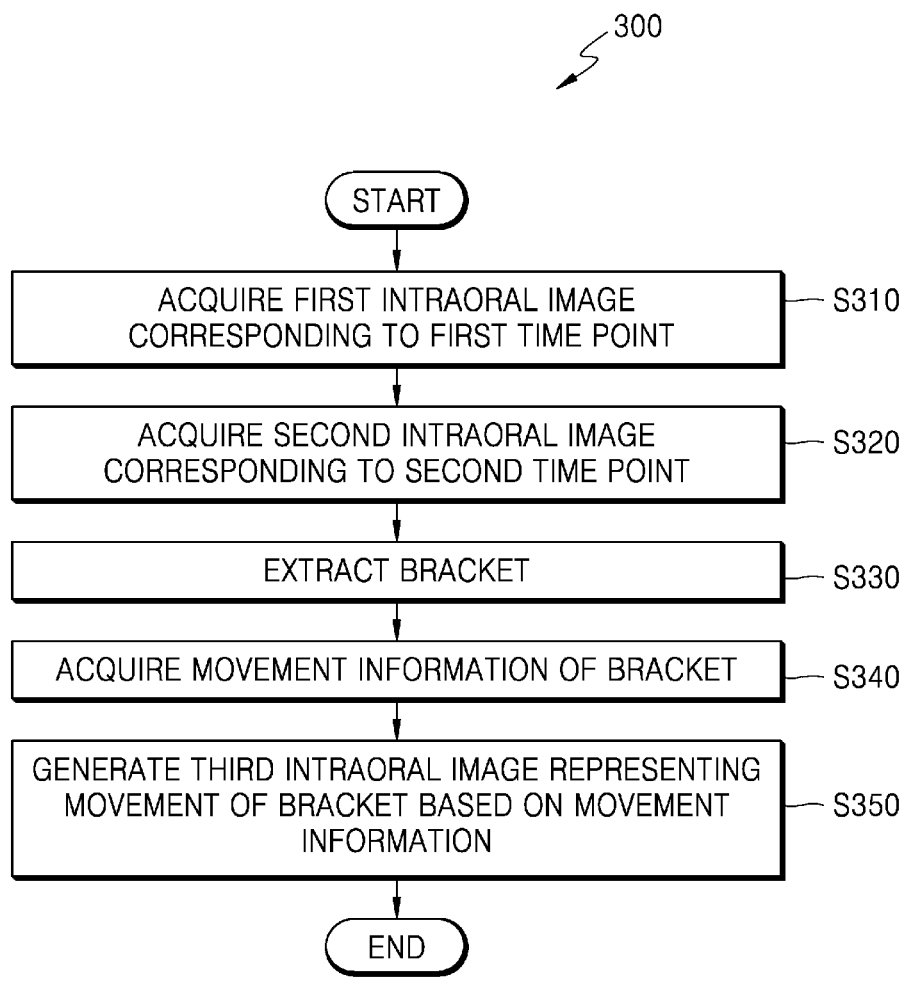
FIG. 3 is a flowchart illustrating a method of processing an intraoral image according to the disclosed embodiment.

FIG. 3 is a flowchart illustrating a method of processing an intraoral image according to the disclosed embodiment.

Referring to FIG. 3, the intraoral image processing method 300 acquires a first intraoral image generated by scanning at least one tooth to which at least one orthodontic device is attached at a first time point (S310).

In the disclosed embodiment, an 'orthodontic device' may refer to an artifact attached to a tooth to correct the position of the tooth. For example, the orthodontic device may include a bracket, an attachment, an orthodontic screw, a lingual orthodontic device, a removable (orthodontic) holding device, and the like. In addition, the orthodontic device may be attached in a form in direct contact with the teeth, such as a bracket. In addition, the orthodontic device may be attached to the tooth in a form detachable such as a removable retaining device, or in a form not in direct contact, with the teeth. The orthodontic device may be attached to at least one of the front and back surfaces of the teeth.

In the disclosed embodiment, an 'orthodontic device' refers to an object to be measured for transfer, movement, or position difference according to the disclosed embodiment. In all of the drawings and detailed description described below, the case in which the orthodontic device is a bracket is shown and described as an example.

The intraoral image processing method 300, at a second time point subsequent to the first time point, acquires a second intraoral image generated by scanning at least one tooth to which at least one orthodontic device (e.g., a bracket) is attached (S320).

The intraoral image processing method 300 extracts at least one orthodontic device (e.g., a bracket) from each of the first intraoral image obtained in operation S310 and the second intraoral image obtained in operation S320 (S330).

The intraoral image processing method 300 acquires movement information of the orthodontic device (bracket) based on at least one bracket extracted from the first intraoral image and at least one orthodontic device (e.g., bracket) extracted from the second intraoral image (S340).

In the course of orthodontic treatment by attaching an orthodontic device to a tooth, the position of the tooth to which the orthodontic device is attached changes over times and as orthodontic treatment progresses. As such, when the position of the tooth is changed according to the correction, the position of the orthodontic device attached to the tooth is also changed. When the position of the tooth and the orthodontic device attached to the tooth changes as the orthodontic treatment progresses, a change in the position of the orthodontic device corresponding to each of the plurality of time points may be referred to as 'transfer of the orthodontic device' or 'movement of the orthodontic device'.

In the accompanying specification and drawings, the above-mentioned 'transfer of orthodontic device', 'movement of orthodontic device', 'position difference of orthodontic device', or 'position change of orthodontic device' will be collectively referred to as 'movement of orthodontic device'. Accordingly, in describing the disclosed embodiments, 'movement' may refers to a difference in location of an object (e.g., an orthodontic device) that occurs between a plurality of different time points (e.g., a first time point and a second time point), a change in the position of an object (e.g., an orthodontic device) occurring between a plurality of different time points (e.g., a first time point and a second time point), or a movement of an object (e.g., an orthodontic device) occurring between a plurality of different time points (e.g., a first time point and a second time point).

The intraoral image processing method 300 generates a third intraoral image indicating movement of at least one orthodontic device (e.g., bracket) during the time from the first time point to the second time point based on the movement information obtained in operation S340 (S350).

Also, the intraoral image processing method 300 according to the disclosed embodiment may further include displaying a user interface screen including the third intraoral image generated in step 340 (operation not shown).

Alternatively, the intraoral image processing method 300 according to the disclosed embodiment may further include transmitting the third intraoral image generated in operation 340 to an external device (e.g., a doctor's computing device, etc.) (not shown).

In the disclosed embodiment, each of the first intraoral image and the second intraoral image is an image obtained by scanning the intraoral cavity of a patient undergoing orthodontic treatment by attaching a bracket to the teeth, and the first intraoral image refers to an image obtained by scanning the intraoral cavity of a patient at a first time point. And, the second intraoral image refers to an image obtained by scanning the intraoral cavity of the patient at a second time point subsequent to the first time point. And, the third intraoral image may be an intraoral image indicating the movement of at least one bracket from the first time point to the second time point.

In addition, each of the first intraoral image and the second intraoral image may be scan data, for example, raw data obtained by scanning the intraoral cavity of the patient. Alternatively, each of the first intraoral image and the second intraoral image may be, data generated in the form of an image by processing scan data for example raw data, obtained by scanning the intraoral cavity of a patient on an image plane.

The intraoral image processing method (e.g., the method 300 shown in FIG. 3) according to the disclosed embodiment may be referred to as a 'processing method' for convenience of description, and will be described in detail below with reference to FIGS. 4a to 13.

Figure 4A:
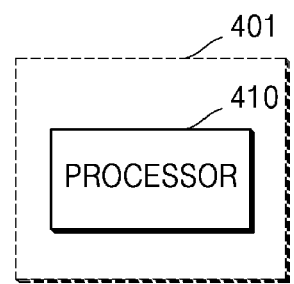
FIG. 4A is a block diagram illustrating an intraoral diagnostic device according to a disclosed embodiment.

FIG. 4A is a block diagram illustrating an intraoral diagnostic device according to a disclosed embodiment.

The intraoral image processing method 300 may be performed through the intraoral diagnostic device 401. Accordingly, the intraoral image processing method 300 illustrated in FIG. 3 may be a flowchart illustrating operations of the intraoral diagnostic device 401.

The intraoral diagnostic device 401 illustrated in FIG. 4A is an example of the intraoral diagnostic device 120 described with reference to FIG. 1, and a redundant description thereof will be omitted.

Referring to FIG. 4A, the intraoral diagnostic device 401 includes a processor 410 that processes an intraoral image.

The processor 410 executes at least one instruction to perform a preset operation.

According to the disclosed embodiment, the processor 410 acquires a first intraoral image generated by scanning at least one tooth to which at least one orthodontic device (e.g., bracket) is attached at a first time point, and acquires a second intraoral image generated by scanning at least one tooth to which at least one orthodontic device (e.g., a bracket) is attached at a second time point subsequent to the first time point. And, the processor 410 extracts the at least one orthodontic device (e.g., bracket) from each of the first intraoral image and the second intraoral image, and acquires movement information of an orthodontic device (e.g., a bracket) based on the at least one orthodontic device (e.g., bracket) extracted from the first intraoral image and the at least one orthodontic device (e.g., bracket) extracted from the second intraoral image. Then, based on the movement information, the processor 410 generates a third intraoral image indicating movement of the at least one orthodontic device (e.g., a bracket) during a time from a first time point to a second time point.

Here, that the processor 410 performs the above-mentioned operations such as 'extract', 'acquire', and 'generate' may refer to controlling other components to perform the above-described operations in addition to directly performing the above-described operations by executing at least one instruction in the processor 410.

Figure 4B:
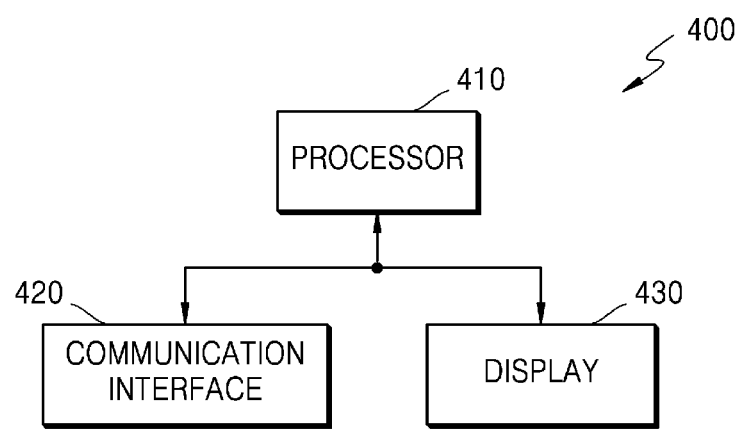
FIG. 4B is another block diagram illustrating an intraoral diagnostic device according to a disclosed embodiment.

FIG. 4B is another block diagram illustrating an intraoral diagnostic device according to a disclosed embodiment.

Referring to FIG. 4B, the intraoral diagnostic device 400 further includes at least one of a communication interface 420 or a display 430, compared to the intraoral diagnostic device 401 illustrated in FIG. 4A.

The display 430 displays a screen. Specifically, the display 430 may display a preset screen under the control of the processor 410. Specifically, the display 430 may display a user interface screen including an intraoral image generated based on data obtained by scanning the intraoral cavity of a patient in an intraoral scanner (e.g., 100 in FIG. 1) (not shown in FIG. 3). Alternatively, the display 430 may display a user interface screen including information related to a patient's dental treatment.

The communication interface 420 may communicate with at least one external electronic device (not shown) through a wired or wireless communication network. Specifically, the communication interface 420 may communicate with an intraoral scanner (e.g., 100 of FIG. 1) (not shown in FIG. 3) under the control of the processor 410. The communication interface 420 may communicate with an external electronic device or server connected through a wired/wireless communication network under the control of the processor 410.

Hereinafter, the processor 410 described with reference to FIGS. 4A and 4B will be described in more detail. Specifically, the processor 410 performs at least one instruction to control an intended operation to be performed. Here, at least one instruction may be stored in an internal memory (not shown) included in the processor 410 or a memory (not shown) included in the intraoral diagnostic device 400 separately from the processor 410.

Specifically, the processor 410 may control at least one component included in the intraoral diagnostic device 400 to perform an intended operation by executing at least one instruction. Accordingly, even if the processor 410 performs preset operations as an example, this may refer to that the processor 410 controls at least one component included in the intraoral diagnostic device 400 so that preset operations are performed.

In particular, the processor 410 may include a RAM (not shown) that stores signals or data input from the outside of the intraoral diagnostic device 400 or is used as a storage area corresponding to various tasks performed in the intraoral diagnostic device 400, a ROM (not shown) that stores a control program and/or a plurality of instructions for controlling the intraoral diagnostic device 400, and at least one processor (not shown) (hereinafter referred to as an 'internal processor') for executing at least one instruction. In particular, the processor 410 shown in FIG. 4B may be implemented in a form that internally includes at least one internal processor and a memory device (e.g., RAM, ROM, etc.) for storing at least one of programs, instructions, signals, and data to be processed or used by the internal processor.

In addition, the processor 410 may include a graphic processing unit (not shown) for processing a graphic corresponding to a video. Also, the processor 410 may be implemented as a system on chip (SoC) in which a core (not shown) and a GPU (not shown) are integrated. Also, the processor 410 may include a single core or multiple cores. For example, the processor 410 may include a dual-core, triple-core, quad-core, hexa-core, octa-core, deca-core, dodeca-core, hexa-dash-vale core, and the like.

In the disclosed embodiment, the processor 410 may generate an intraoral image based on data received from an intraoral scanner (not shown).

Specifically, according to the control of the processor 410, the communication interface 420 may receive data acquired from an intraoral scanner (e.g., 100 in FIG. 1), for example, raw data acquired through an intraoral scan. In addition, the processor 410 may generate a three-dimensional intraoral image representing the intraoral cavity in three dimensions based on the raw data received from the communication interface 420. For example, the intraoral scanner (not shown) may include an L camera (not shown) corresponding to a left field of view and an R camera (not shown) corresponding to a right field of view to restore a three-dimensional image according to the optical triangulation method. In addition, an intraoral scanner (not shown) may acquire L image data corresponding to a left field of view and R image data corresponding to a right field of view from the respective L camera (not shown) and R camera (not shown). Subsequently, the intraoral scanner (not shown) may transmit the raw data including the L image data and the R image data to the communication interface 420 of the intraoral diagnostic device 400.

Then, the communication interface 420 may transmit the received raw data to the processor 410, and the processor 410 may generate an intraoral image representing the intraoral cavity in three dimensions based on the received raw data.

In addition, the processor 410 may control the communication interface 420 to directly receive an intraoral image representing the intraoral cavity from an external server (not shown), a medical device, or the like. In this case, the processor 410 may acquire a three-dimensional intraoral image without generating a three-dimensional intraoral image based on raw data. Specifically, the processor 410 may acquire a plurality of three-dimensional intraoral images corresponding to each of a plurality of different time points.

Hereinafter, for convenience of description, an 'intraoral image' is an intraoral image representing an intraoral cavity in three dimensions, and an image representing at least one tooth to which a bracket is attached will be described and illustrated as an example.

The communication interface 420 may communicate with an external electronic device (not shown) (e.g., an intraoral scanner, a server, or an external medical device) through a wired/wireless communication network. Specifically, the communication interface 420 may include at least one short-distance communication module (not shown) for performing communication according to communication standards such as Bluetooth, Wi-Fi, Bluetooth Low Energy (BLE), NFC/RFID, Wifi Direct, UWB, or ZIGBEE.

In addition, the communication interface 420 may further include a long-distance communication module (not shown) for performing communication with a server (not shown) for supporting long-distance communication according to a telecommunication standard. Specifically, the communication interface 420 may include a long-distance communication module (not shown) for performing communication through a network for Internet communication. In addition, the communication interface 420 may include a long-distance communication module for performing communication through a communication network conforming to a communication standard such as 3G, 4G, and/or 5G.

In addition, the communication interface 420 may include at least one port (not shown) for connecting to an external electronic device and a wired cable to communicate with an external electronic device (e.g., intraoral scanner, etc.) by wire. For example, the communication interface 420 may include a cable connection port, such as an HDMI port (not shown). Accordingly, the communication interface 420 may communicate with an external electronic device connected by wire through at least one port (not shown).

The display 430 may output a user interface screen corresponding to video data through an internally included display panel (not shown) so that the user may visually recognize the video data corresponding to the user interface screen.

Figure 5:
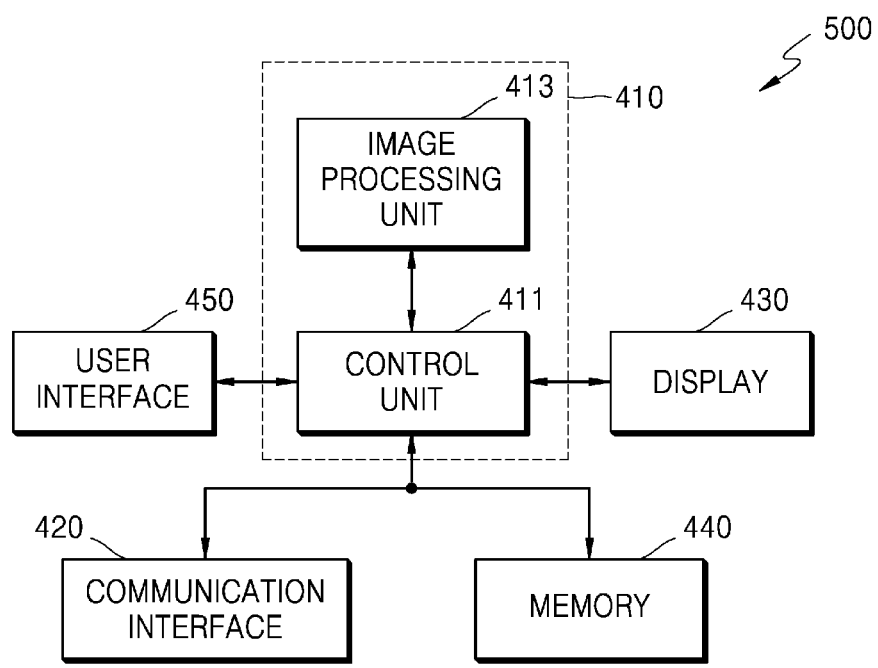
FIG. 5 is another block diagram illustrating an intraoral diagnostic device according to a disclosed embodiment.

FIG. 5 is another block diagram illustrating an intraoral diagnostic device according to a disclosed embodiment. The intraoral diagnostic device 500 illustrated in FIG. 5 may correspond to the intraoral diagnostic devices 120 and 400 illustrated in FIGS. 1 and 4B. Referring to FIG. 5, the intraoral diagnostic device 500 may further include at least one of a memory 440 and a user interface 450 compared to the intraoral diagnostic device 400. In the accompanying drawings, since the same reference numerals indicate the same configuration, overlapping descriptions are omitted.

The memory 440 may store at least one instruction. Also, the memory 440 may store at least one instruction to be executed by the processor 410. Also, the memory 440 may store at least one program executed by the processor 410. In addition, the memory 440 may store data received from an intraoral scanner (not shown) (e.g., raw data obtained through an intraoral scan, etc.). Alternatively, the memory 440 may store an intraoral image representing the intraoral cavity in three dimensions.

The user interface 450 may receive a user input for controlling the intraoral diagnostic device 500. The user interface 450 may include a user input device including a touch panel for sensing a user's touch, a button for receiving a user's push operation, a mouse or keyboard for designating or selecting a point on the user interface screen, and the like, but is not limited thereto.

Also, the user interface 450 may include a voice recognition device (not shown) for voice recognition. For example, the voice recognition device (not shown) may be a microphone, and the voice recognition device may receive a user's voice command or voice request. Accordingly, the processor 410 may control an operation corresponding to a voice command or a voice request to be performed.

Also, the processor 410 may include a control unit 411 and an image processing unit 413.

Specifically, the control unit 411 controls the overall operation of the intraoral diagnostic device 500. For example, the control unit 411 may generally control internal components by executing at least one instruction and/or programs stored in the memory 440 or the control unit 411.

The image processing unit 413 may perform operations for generating and/or processing an image. Specifically, the image processing unit 413 may receive raw data obtained from an intraoral scanner (not shown) and generate an intraoral image based on the received data. Specifically, the image processing unit 413 may generate a first intraoral image and a second intraoral image respectively corresponding to the first time point and the second time point. Alternatively, the image processing unit 413 may generate a plurality of intraoral images corresponding to each of a plurality of time points having a preset interval.

Specifically, the image processing unit 413 may acquire movement information of the bracket based on the at least one bracket extracted from the first intraoral image corresponding to the first time point and the at least one bracket extracted from the second intraoral image corresponding to the second time point. And, based on the movement information, it is possible to generate a third intraoral image representing the movement of the at least one bracket from the first time point to the second time point. Here, the first time point may represent an arbitrary time point, and the second time point may represent a time point at which a preset time, for example, one month or three months, has elapsed from the first time point.

Hereinafter, intraoral images obtained in operations S310 and S320 of FIG. 3 will be described in detail with reference to FIGS. 6 to 8. In addition, for convenience of description, below, in describing the intraoral image processing method 300 according to the disclosed embodiment, the intraoral diagnostic device 400 shown in FIG. 4B will be referred to and described in detail. That is, the case in which the operating subject of the intraoral image processing method (e.g., 300) according to the disclosed embodiment is the intraoral diagnostic device 400 shown in FIG. 4B will be described as an example.

In addition, the intraoral diagnostic device 400 may store and execute dedicated software linked to the intraoral scanner. Here, the dedicated software may be called a dedicated program, a dedicated tool, or a dedicated application. When the intraoral diagnostic device 400 operates in conjunction with the intraoral scanner (120 in FIG. 1), the dedicated software stored in the intraoral diagnostic device 400 may be connected to an intraoral scanner (120 in FIG. 1) to receive data acquired through an intraoral scan in real time. For example, there is a dedicated software for processing the data acquired through the intraoral scan in the i500 corresponding to the i500 product, which is the company's intraoral scanner. Specifically, the company produces and distributes 'Medit Link', a software for processing, managing, using, and/or transmitting data acquired from an intraoral scanner (e.g., i500). Here, 'dedicated software' refers to a program, tool, or application that may be operated in conjunction with the intraoral scanner, such that 'dedicated software' may be commonly used by various intraoral scanners developed and sold by various manufacturers. In addition, the above-described dedicated software may be produced and distributed separately from an intraoral scanner that performs an intraoral scan.

The intraoral diagnostic device 400 may store and execute dedicated software corresponding to the i500 product. The delivery software may perform at least one operation to acquire, process, store, and/or transmit the intraoral image. Here, the dedicated software may be stored in the processor 410. In addition, dedicated software may provide a user interface for use of data acquired from the intraoral scanner. Here, the user interface screen provided by the dedicated software may include an intraoral image generated according to the disclosed embodiment. For example, in the disclosed embodiment, the user interface screen provided by the dedicated software may be any one of the user interface screens shown in FIGS. 12 to 20.

In the case of the intraoral diagnostic device 500 shown in FIG. 5, dedicated software may be stored in at least one of the control unit 411 and the memory 440.

Figure 6:
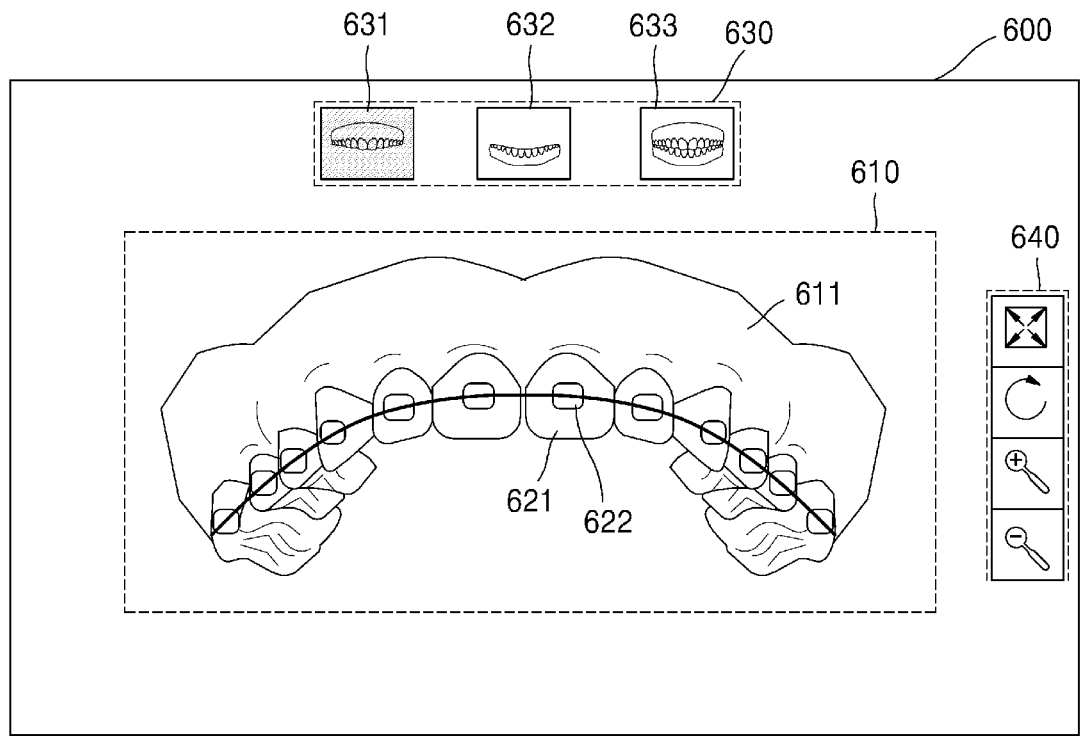
FIG. 6 is a diagram illustrating an example of an intraoral image obtained through an intraoral scan.
Figure 7:
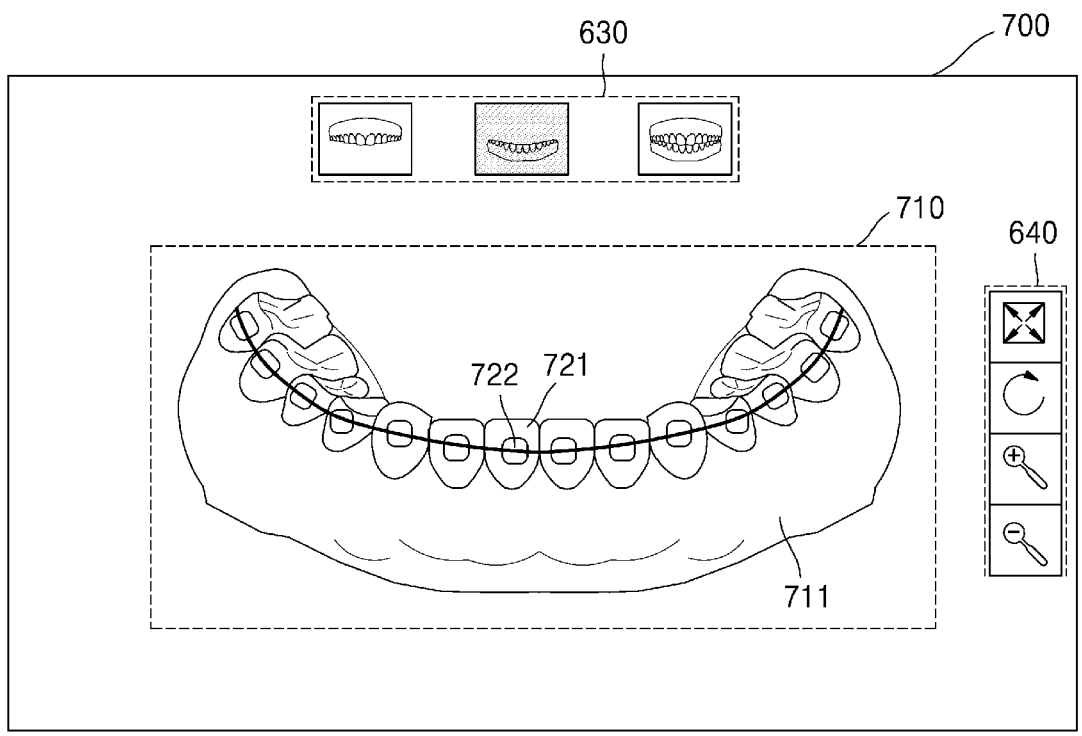
FIG. 7 is a diagram illustrating another example of an intraoral image obtained through an intraoral scan.
Figure 8:
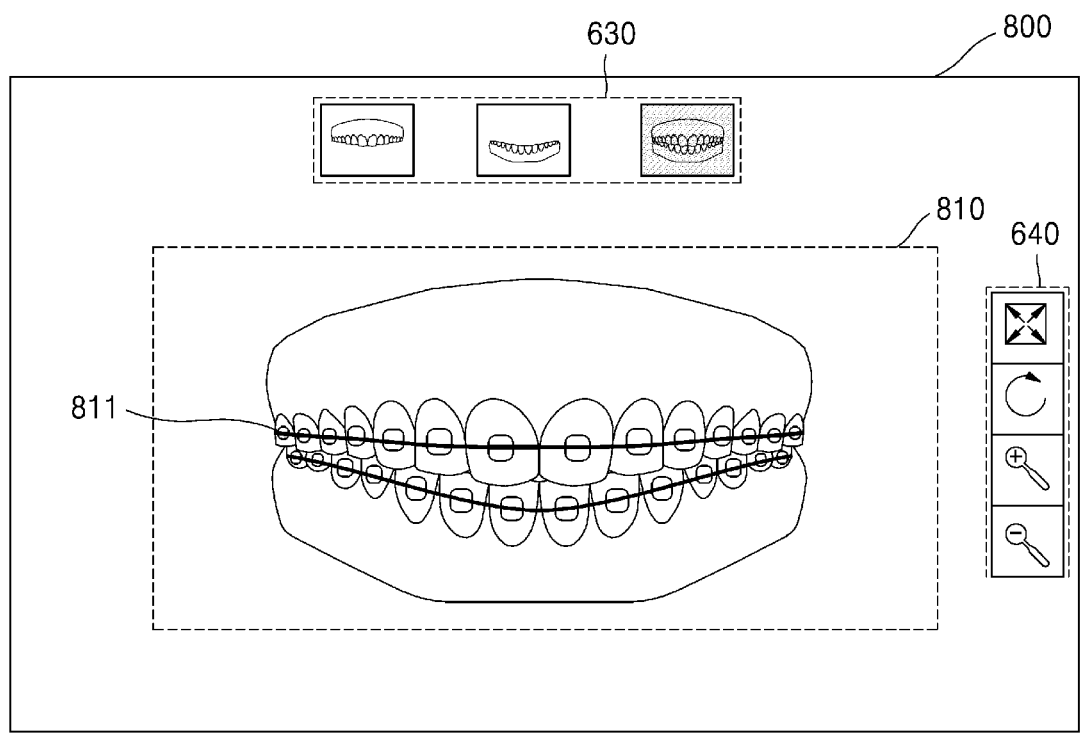
FIG. 8 is a diagram illustrating another example of an intraoral image obtained through an intraoral scan.

In FIGS. 6 to 8 below, a case in which the processor 410 in which a dedicated processor is stored and executed performs operations for generating and processing an intraoral image based on data acquired from an intraoral scanner (not shown) will be described as an example. In addition, in the drawings to be described below, a case of acquiring an intraoral image based on raw data obtained by scanning the intraoral cavity of a patient undergoing orthodontic treatment by attaching at least one bracket to at least one tooth is exemplified.

FIG. 6 is a diagram illustrating an example of an intraoral image obtained through an intraoral scan.

FIG. 7 is a diagram illustrating another example of an intraoral image obtained through an intraoral scan.

FIG. 8 is a diagram illustrating another example of an intraoral image obtained through an intraoral scan.

Referring to FIG. 6, the processor 410 may acquire an intraoral image 610 representing the patient's upper jaw 611 in three dimensions based on the raw data obtained by scanning the patient's upper jaw in an intraoral scanner (not shown). A bracket 622 is attached to the patient's teeth (e.g., 621) during orthodontic treatment. Accordingly, in the intraoral image 610 representing the patient's upper jaw includes the teeth 621 and the bracket 622.

In addition, the processor 410 may generate the user interface screen 600 including the intraoral image 610 and visually output the generated user interface screen 600 through the display 430. Here, the user interface screen 600 may include menu bars 630 and 640 including at least one menu for a user (e.g., a dentist, etc.) to use data obtained by scanning a tooth in an intraoral scanner (not shown). For example, the user interface screen 600 may include a menu bar 630 indicating a portion of an object currently being scanned. For example, the menu bar 630 may include an upper jaw menu 631 indicating that the scan target is the upper jaw of the mouth, a lower jaw menu 632 indicating that the scan target is the lower jaw of the intraoral cavity; and an occlusion menu 633 indicating that the scan target includes both the upper and lower jaws of the intraoral cavity.

In FIG. 6, since the intraoral image 610 corresponds to the upper jaw of the intraoral cavity, the menu 631 may be highlighted and displayed.

Also, the user interface screen 600 may further include a menu bar 640 including at least one menu for editing or changing the acquired intraoral image. For example, the menu bar 640 may include menus including enlargement, reduction, full screen view, and previous image view of the intraoral image 610.

Referring to FIG. 7, the processor 410 may acquire an intraoral image 710 representing the lower jaw 711 of the patient in three dimensions based on the raw data obtained by scanning the patient's lower jaw in an intraoral scanner (not shown). In addition, the processor 410 may generate the user interface screen 700 including the intraoral image 710 and visually output the generated user interface screen 700 through the display 430.

Referring to FIG. 8, the processor 410 may acquire an intraoral image 810 representing the patient's upper and lower jaws 811 three-dimensionally based on the raw data obtained by scanning the intraoral cavity with the patient's upper and lower jaws occluded using an intraoral scanner (not shown). In addition, the processor 410 may generate the user interface screen 700 including the intraoral image 810 and visually output the generated user interface screen 700 through the display 430. Hereinafter, an intraoral image representing all of the upper and lower jaws will be referred to as an 'occlusal image'.

Referring back to FIG. 3, the processing method 300 may acquire a first intraoral image corresponding to a first time point (S310). Operation S310 may be performed by the processor 410. Here, the 'first intraoral image corresponding to the first time point' refers to an intraoral image generated based on data obtained by scanning the intraoral cavity of the patient at the first time point.

Then, the processing method 300 may acquire a second intraoral image corresponding to a second time point subsequent to the first time point (S320). Operation S320 may be performed by the processor 410.

Here, the first time point and the second time point may correspond to time points at which a patient in an orthodontic treatment process visits a dentist to check an orthodontic treatment process, respectively.

For example, the second time point may be the current time point or the most recent time point closest to the present in the course of orthodontic treatment. In addition, the first time point may be a time point before the second time point.

For example, in orthodontic treatment, if it is necessary to visit the dentist once a month to check the orthodontic process, the first time point may be 2020 Feb. 1, and the second time point may be 2020 Mar. 1, that is, an adjacent inspection period. For example, if a patient visits the dentist to check the orthodontic process on the current time point, 2020 Mar. 1, a second intraoral image may be acquired by scanning the patient's mouth on 2020 Mar. 1. In addition, the first time point may be a date of 2020 Feb. 1, which is a time point of the immediately preceding dental visit based on the second time point. As in the above example, the second time point and the first time point are respectively set as the current calibration check time point and the previous calibration check time point, and it is possible to generate a third intraoral image indicating the movement of the bracket during the time interval between the set first time point and the second time point. Then, the dentist will be able to more easily determine and diagnose the direction in which orthodontic treatment is supposed to proceed in the future by referring to the third intraoral image.

As another example, the first time point and the second time point may be two different time points set by a user such as a doctor. For example, when the dentist wants to check the patient's past orthodontic history, the dentist may set two past time points to be checked as the first time point and the second time point.

Specifically, the second time point may be a current time point, a recent time point close to the present, or a time point in the past. Also, it is sufficient that the first time point is a time point preceding the second time point.

Here, each of the first intraoral image and the second intraoral image may include at least one of the upper jaw image 610, the lower jaw image 710, and the occlusal image 810 described with reference to FIGS. 6 to 8. In the disclosed embodiment, in providing an intraoral image so that a user may more accurately analyze and diagnose the progress of correction, the upper jaw image 610, the lower jaw image 710, and the occlusal image 810 are all available.

That is, in the disclosed embodiment, the 'third intraoral image showing the movement of the bracket', which is provided to enable the user to analyze and diagnose the progress of the correction more accurately, may include an upper jaw image indicating the movement of the bracket, a lower jaw image indicating the movement of the bracket, and an occlusal image indicating the movement of the bracket, respectively.

However, hereinafter, for convenience of description, the case in which the intraoral image acquired in operations S310 and S320 is an upper jaw image will be described as an example.

In addition, in FIG. 3, the case of acquiring an intraoral image at each of the first time point and the second time point has been described as an example, but an intraoral image may be acquired at each of three or more different time points, and an intraoral image corresponding to each of two different time points may be selected and used among the acquired intraoral images.

In addition, it may be possible to acquire and use an intraoral image at each of three or more different time points. Specifically, when an intraoral image is acquired at each of the first time point, the second time point, and the third time point subsequent to the second time point, a bracket may be extracted from the intraoral image corresponding to each of the above-described first time point, second time point, and third time point (S330). And, based on the at least one bracket extracted from the first intraoral image, the at least one bracket extracted from the second intraoral image, and the at least one bracket extracted from the intraoral image corresponding to the third time point, bracket movement information may be obtained (S340). Then, based on the movement information, a user interface screen including a third intraoral image indicating movement or transfer of at least one bracket during a time interval including a first time point, a second time point, and a third time point may be displayed (S350).

In FIGS. 3 to 20 of the present specification, for convenience of explanation, a case in which an intraoral image is obtained at each of the first time point and the second time point and then a third intraoral image is generated will be described and illustrated.

Referring again to FIG. 3, a bracket is extracted from the first intraoral image and a bracket is extracted from the second intraoral image (S330). Operation S330 may be performed by the processor 410.

Specifically, the processor 410 may extract only the bracket from each of the first intraoral image and the second intraoral image. For example, the processor 410 extracts only the area where the bracket is imaged from the first intraoral image, which is a three-dimensional intraoral model, and the extracted bracket may include information on three-dimensional coordinates corresponding to the bracket included in the first intraoral image. That is, since the processor 410 extracts only the area in which the bracket is imaged on the intraoral image, which is a three-dimensional intraoral model, it is possible to obtain three-dimensional coordinate information for the area in which the bracket is imaged.

In addition, operation S330 may include replacing each of the at least one bracket extracted from the first intraoral image and the at least one bracket extracted from the second intraoral image with a library corresponding to each of the bracket (operation not shown), and obtaining the movement information of the bracket based on the replaced libraries (operation not shown).

Specifically, in operation S330, after brackets are extracted from each of the first intraoral image and the second intraoral image, the extracted brackets may be substituted with a library corresponding to the brackets. Here, the 'library corresponding to the bracket' may refer to a model, image, figure, or marker indicating the bracket. Also, the library corresponding to the bracket may be an image representing the exact same bracket as the bracket extracted from the intraoral image, or may be an image representing a bracket similar to the bracket extracted from the intraoral image.

Specifically, when the bracket is formed of a metallic material, due to the nature of reflection of light, there may be cases in which the complete form may not be imaged through an intraoral scan. Accordingly, the shape of the bracket extracted from each of the first intraoral image and the second intraoral image may have an incomplete shape. Therefore, in the case of replacing the extracted bracket with the library, it will be possible to check the extraction area of the bracket more accurately. In this case, the movement information of the bracket may be obtained by comparing the replaced libraries.

Also, in operation S330, extracting the bracket from the intraoral image may be performed through an image processing method based on machine learning.

Here, machine learning may be performed through a Computer Aided Detection & Diagnosis (CAD) system that determines and detects whether an object to be extracted (e.g., a bracket) is included in the input image through computer operation, data-based statistical machine learning, or an artificial intelligence system that performs machine learning according to artificial intelligence technology.

In the disclosed embodiment, the processor 410 may analyze the intraoral image using computer-based image processing technology, and as a result of the analysis, acquire information for extracting the bracket, which is the target information (e.g., information on the area in which the bracket exists).

Here, the artificial intelligence (AI) system is a system in which the machine learns and makes decisions on its own, unlike the existing rule-based smart system, and generates the results requested by the user. An example of extracting a bracket using an AI system will be described in detail with reference to FIGS. 9 and 11 below.

Figure 9:
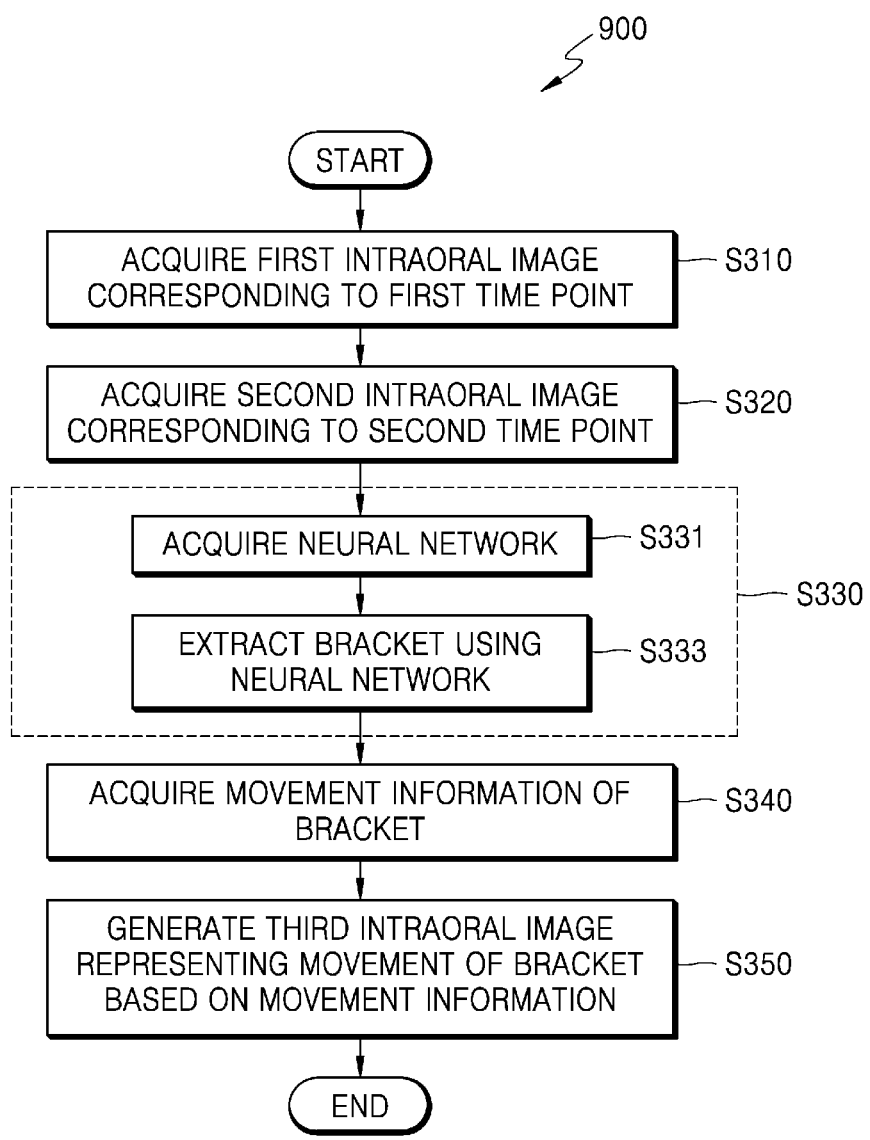
FIG. 9 is another flowchart illustrating a method of processing an intraoral image according to the disclosed embodiment.

FIG. 9 is another flowchart illustrating a method of processing an intraoral image according to the disclosed embodiment. In the intraoral image processing method 900 illustrated in FIG. 9, the same components as the intraoral image processing method 300 described with reference to FIG. 3 are illustrated using the same reference numerals. Accordingly, in describing the intraoral image processing method 900, a description overlapping with the intraoral image processing method 300 will be omitted.

Referring to FIG. 9, the intraoral image processing method 900 includes extracting a bracket from a first intraoral image and extracting a bracket from a second intraoral image (S330). Operation S330 may be performed by the processor 410.

Specifically, in step S330, the bracket may be extracted from the first intraoral image and the bracket may be extracted from the second intraoral image using a neural network (S333). That is, operation S333 may be performed using artificial intelligence (AI) technology that performs an operation through a neural network, analyzes an input image, and extracts a bracket.

Here, the neural network is a neural network for extracting brackets from the intraoral image, and may optimize the weight values in the neural network by training the learning data (e.g., a plurality of different intraoral images obtained by scanning a tooth to which a bracket is attached). In addition, a target result may be output by self-learning the input data through a neural network having an optimized weight value.

Specifically, operation S333 may include inputting each of the first intraoral image and the second intraoral image into the neural network trained to extract brackets (operation not shown), and obtaining the at least one bracket corresponding to the first intraoral image and at least one bracket corresponding to the second intraoral image output from the neural network (operation not shown).

In addition, the processor 410 may directly perform an operation through the neural network, including a program for performing an operation according to the neural network. That is, the processor 410 may extract the bracket from the intraoral image by directly performing an operation according to the neural network. In addition, the above-described operation through the neural network may be performed by at least one of the image processing unit 413 and the control unit 411 shown in FIG. 5.

Specifically, the processor 410 may obtain a neural network learned to extract the bracket (S331). In detail, the processor 410 may acquire a neural network trained to extract a bracket from a tooth to which the bracket is attached based on a plurality of intraoral images including at least one tooth to which the bracket is attached (S331).

Then, the processor 410 may perform the operation of operation S333 by using the neural network obtained in step S331.

The neural network used for the extraction of the bracket will be described in detail with reference to FIG. 10 below.

Figure 10:
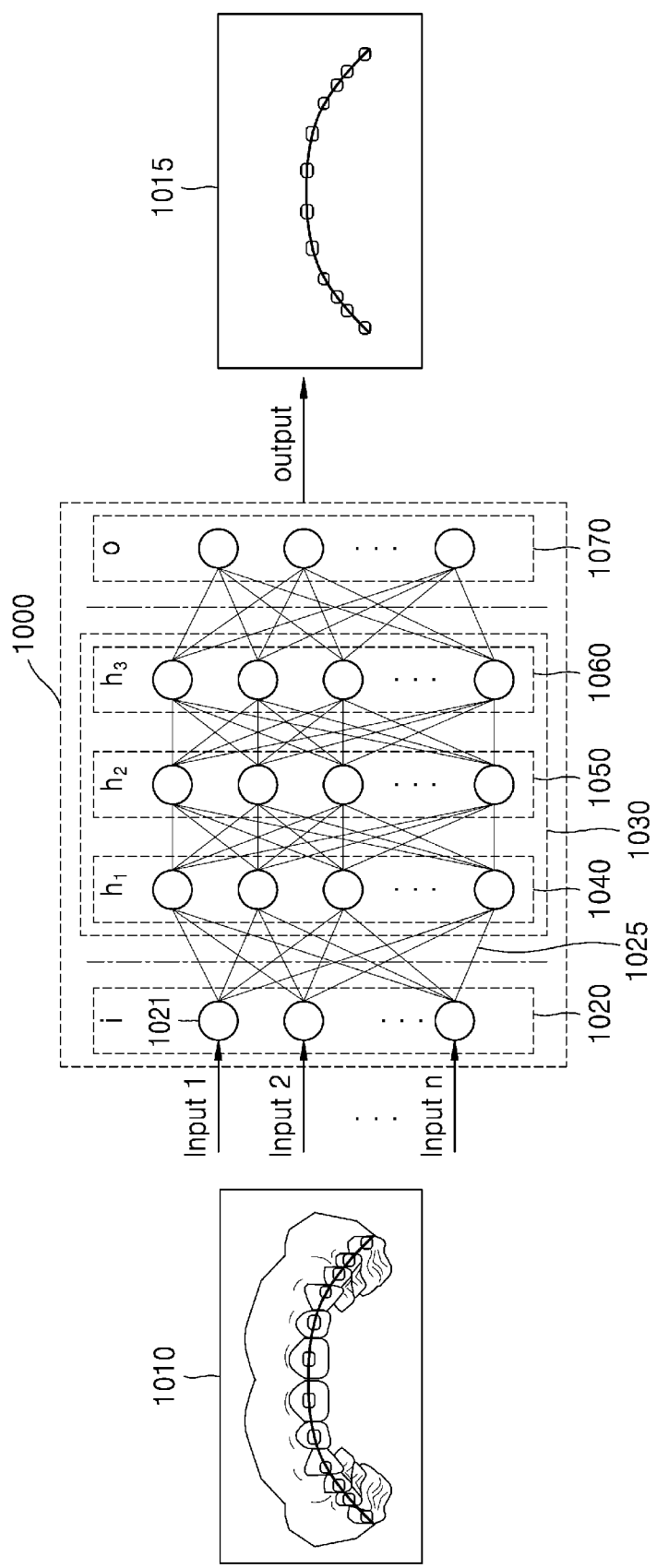
FIG. 10 is a diagram for explaining a neural network that receives an intraoral image and performs an operation for extracting a bracket.

FIG. 10 is a diagram for explaining a neural network that receives an intraoral image and performs an operation for extracting a bracket.

The neural network used in the disclosed embodiment may be a deep neural network (DNN). Also, the deep neural network (DNN) may be formed as a convolutional neural network (CNN). Here, the convolutional neural network refers to a neural network that performs an operation based on a convolution operation, and may be a single neural network that comprehensively performs convolutional computation and other computations, or a neural network in which a plurality of neural networks are combined.

In the disclosed embodiment, a data recognition model may be implemented through a neural network, and the implemented data recognition model may be trained using training data. Here, the training data may be intraoral images in which brackets are imaged. In addition, a certain region (e.g., a bracket region) or a certain partial image (e.g., a partial image in which brackets are displayed) included in the input data may be classified using the training data recognition model. Here, the input image is an intraoral image of a patient undergoing orthodontic treatment, and may be a two-dimensional image. Alternatively, the input image may be a three-dimensional image that is a three-dimensional intraoral model generated by scanning a patient's intraoral cavity.

The neural network may receive an input image and perform a convolution operation for extracting a bracket to generate an output image from which the bracket is extracted.

In FIG. 10, a case in which the neural network used in the disclosed embodiment is a deep neural network (DNN) including three hidden layers is illustrated as an example. Also, a case in which the intraoral image 610 shown in FIG. 6 is used as the input image 1010 is illustrated as an example.

Referring to FIG. 10, the neural network 1000 includes an input layer 1020, a hidden layer 1030, and an output layer 1070. Specifically, each of the plurality of layers forming the neural network 1000 may include a plurality of nodes (e.g., 1021) for receiving data. In addition, two adjacent layers are connected by a plurality of edges (e.g., 1025) as shown. Each node has a corresponding weight value. Accordingly, the neural network 1000 may obtain output data based on a value obtained by calculating an input signal and a weight value (e.g., a convolution operation, etc.).

Also, a plurality of nodes included in the input layer 1020 of the neural network 1000 receives a plurality of data corresponding to the input image 1010. Here, the plurality of data may be a plurality of partial images generated by performing filter processing to divide the input image 1010.

And, through the operation in the plurality of layers 1040, 1050, and 1060 included in the hidden layer 1030, the output layer 1070 may output the output data obtained as a result of analyzing the input image 1010. Here, the output data may be an image 1015 obtained by extracting only the brackets included in the input image 1010. In FIG. 10, a case in which the wire connecting the brackets is included in the image 1015 is shown as an example, but the image 1015 output from the neural network 1000 may include only the brackets except for the wire.

Specifically, the neural network 1000 may be formed as a CNN neural network based on a convolution (CNN) operation. Here, the certain form and specification of the neural network 1000 may vary according to a used model and certain design specifications.

Specifically, the neural network 1000 may be a deep neural network (DNN) that performs a convolution operation to separate the brackets by executing pixel-wise segmentation from the intraoral image. For example, the neural network 1000 may be a neural network based on Deeplab-Mobilenet. Hereinafter, a neural network based on Deeplab-Mobilenet will be referred to as a 'Deeplab model'. The Deeplab model may classify whether each pixel in the input 2-dimensional intraoral image corresponds to a bracket by performing pixel-wise-based segmentation from a 2-dimensional image. And, the Deeplab model may generate an output image from which the bracket is extracted by dividing the bracket and the non-bracket area (e.g., teeth, gingiva, etc.) based on the classification result.

In addition, to increase the accuracy of the output data output through the neural network 1000, weight values of nodes (e.g., 1921) forming the neural network 1000 may be modified to increase the accuracy of the output data by performing training in the direction of the input layer 1020 from the output layer 1070. Therefore, the neural network 1000 may learn a plurality of intraoral images obtained by scanning the intraoral cavity of a patient undergoing orthodontic treatment before the input image 1010 is input, and may modify the weight value of each node in a direction to increase the detection accuracy of the bracket. In addition, to increase the accuracy of the neural network, a user (e.g., a dentist, a designer of the neural network 1000, etc.) may generate a masking image by directly displaying or masking a bracket region in each of a plurality of intraoral images used for training of the neural network. And, by using the masking image as ground truth information for verification, a neural network learning process may be performed by comparing it with the output image to the neural network.

Figure 11:
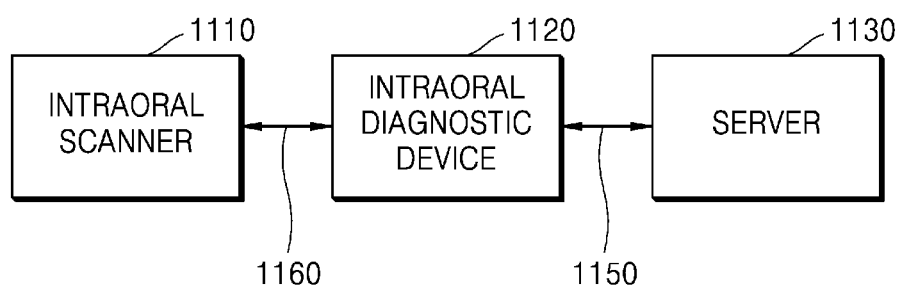
FIG. 11 is a diagram for explaining communication between an intraoral diagnostic device and external devices.

FIG. 11 is a diagram for explaining communication between an intraoral diagnostic device and external devices. The intraoral diagnostic device 1120 shown in FIG. 11 may correspond to the intraoral diagnostic device 400 or 500 described with reference to FIG. 4B or FIG. 5. Also, the intraoral scanner 1110 illustrated in FIG. 11 may correspond to the intraoral scanner 100 described with reference to FIG. 1. Therefore, in describing the intraoral scanner 1110 and the intraoral diagnostic device 1120 shown in FIG. 11, descriptions overlapping those of FIGS. 1 to 10 will be omitted.

In the disclosed embodiment, the above-described operation through the neural network may be performed through an external device capable of communicating with the intraoral diagnostic device 1120. In FIG. 11, a case in which the external device is the server 1130 is illustrated as an example. In this case, the intraoral diagnostic device 1120 may receive the bracket extraction information obtained from the server 1130 through the communication interface 420. Specifically, the intraoral diagnostic device 1120 may receive intraoral scan data from the intraoral scanner 1110 through the wired/wireless communication network 1160. In addition, the intraoral diagnostic device 1120 may acquire an intraoral image based on the received intraoral scan data, and transmit the acquired intraoral image to the server 1130 through the wired/wireless communication network 1150. Then, the server 1130 may input the received intraoral image to the neural network to obtain output data corresponding thereto (e.g., an image from which brackets are extracted). Then, the server 1130 may transmit the output data of the neural network to the intraoral diagnostic device 1120 through the communication network 1150.

Also, the server 1130 may generate the neural network 1000 described with reference to FIG. 10, and receive the generated neural network 1000 through the wired/wireless communication network 1150. The neural network (e.g., 1000 in FIG. 10) received by the intraoral diagnostic device 1120 may be a neural network that has been trained to extract a bracket from the intraoral image.

The server 1130 may include a high-spec memory device and may perform a high-speed calculation operation. Accordingly, the server 1130 may provide a memory capacity capable of learning more training data in acquiring the learned neural network. Accordingly, when the server 1130 learns the neural network 1000 or obtains output data from the neural network 1000, complex operations may be quickly performed.

Referring back to FIG. 3, the intraoral image processing method 300 may obtain movement information of the bracket based on the at least one bracket extracted from the first intraoral image and the at least one bracket extracted from the second intraoral image (S340). Operation S340 may be performed by the processor 410. Here, the movement information of the bracket may include information on at least one of a distance corresponding to the movement of the bracket from the first time point to the second time point, a movement direction, a position difference, a movement time, or a movement speed.

Each of the first intraoral image and the second intraoral image may be a plurality of two-dimensional images or two-dimensional scan data obtained through an intraoral scan. In this case, in relation to the movement information of the bracket, by comparing each of the first intraoral image and the second intraoral image, which are two-dimensional images, information on the movement of the bracket in two dimensions may be obtained. The movement information of the bracket may be obtained for each of a plurality of scan data. Therefore, based on the movement information obtained from each of the plurality of scan data, it may be possible to reconstruct the movement of the bracket three-dimensionally.

In addition, each of the first intraoral image and the second intraoral image may be a three-dimensional model of the intraoral cavity representing the intraoral cavity in three dimensions. When the neural network 1000 extracts a bracket attached to the first intraoral image, the output image 1015 may obtain an image representing a region in which the bracket locates and a three-dimensional coordinate value for the region in which the bracket is located. In this case, both the bracket extracted from the first intraoral image and the bracket extracted from the second intraoral image include information about three-dimensional coordinate values. Therefore, when the movement information of the bracket is obtained based on the bracket extracted from the first intraoral image and the bracket extracted from the second intraoral image, the amount of movement of the bracket in the three-dimensional X, Y, and Z directions may be obtained.

Figure 12:
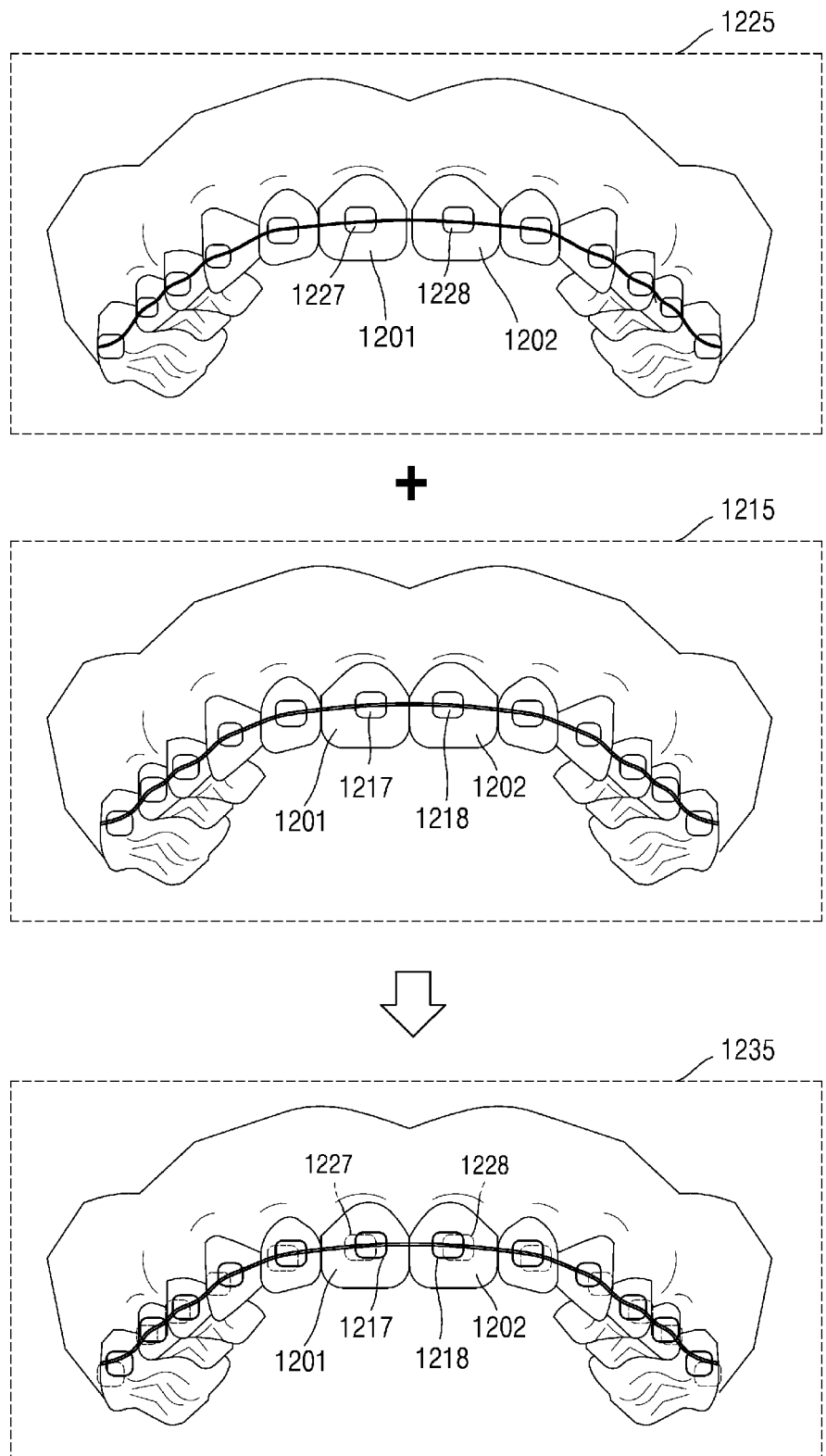
FIG. 12 is a view for explaining an operation for calculating the movement of the bracket according to the disclosed embodiment.

FIG. 12 is a view for explaining an operation for calculating the movement of the bracket according to the disclosed embodiment. In FIG. 12, a case in which the first and second intraoral images are intraoral images 1215 and 1225 three-dimensionally representing the upper jaw of the patient, such as the intraoral image 610 shown in FIG. 6, are illustrated and described.

Referring to FIG. 12, based on the brackets 1227 and 1228 extracted from the first intraoral image 1225 obtained by scanning the intraoral cavity at the first time point and the brackets 1217 and 1218 extracted from the second intraoral image 1215 obtained by scanning the intraoral cavity at the second time point, it is possible to obtain the movement information of the bracket.

Specifically, the processor 410 may extract the bracket attached to the tooth from the first intraoral image 1225. Specifically, the processor 410 may extract the bracket 1228 attached to the 21st tooth 1202 from the first intraoral image 1225 and extract the bracket 1227 attached to the 11th tooth 1201. Also, the processor 410 may extract all other brackets included in the first intraoral image 1225.

Also, the processor 410 may extract the bracket attached to the tooth from the second intraoral image 1215. Specifically, the processor 410 may extract the bracket 1218 attached to the 21st tooth 1202 from the second intraoral image 1215 and extract the bracket 1217 attached to the 11th tooth 1201. Also, the processor 410 may extract all other brackets included in the second intraoral image 1215.

And, based on the brackets 1227 and 1228 extracted from the first intraoral image 1225 and the brackets 1217 and 1218 extracted from the second intraoral image 1215, bracket movement information indicating movement between the brackets may be obtained, and a third image 1235 may be generated based on the obtained movement information.

Here, the reference position or reference coordinates between the brackets 1227 and 1228 extracted from the first intraoral image 1225 and the brackets 1217 and 1218 extracted from the second intraoral image 1215 are matched, and bracket movement information may be obtained based on the matched result. Here, the reference position or reference coordinates may refer to a position or coordinates serving as a reference to measure the transfer amount (or movement amount) of the bracket between two different time points when the position of the tooth to which the bracket is attached changes as the orthodontic time elapses. Here, the transfer amount or the movement amount may refer to at least one of a movement distance, a movement direction, a movement vector, a movement speed, or a movement time of an object (e.g., a bracket) that is a target of movement measurement.

Specifically, due to differences in the acquisition time point, the person who performed the scan, the scanning method, and the like, the first intraoral image 1225 and the second intraoral image 1215 may have differences in the imaged position of the object (e.g., tooth, gum, bracket, etc.) and in the imaged size between the objects. Therefore, in the first intraoral image 1225 and the second intraoral image 1215, which are two different intraoral images, the movement of the bracket between two different time points may be measured when the position and/or size of the imaged objects in the intraoral images is completely adjusted. As described above, before measuring the movement of the bracket between two different time points, the operation of completely adjusting/matching the reference position, size, and/or magnification of the imaged object in different intraoral images may be referred to as 'registration', or 'adjustment' or 'matching' as described above.

For example, the bracket 1227 extracted from the first intraoral image 1225 and the bracket 1217 extracted from the second intraoral image 1215 may be aligned with each other so that they are displayed in the same coordinate system with the same size.

Specifically, a registration image or a matching image (not shown) may be generated by matching/registering the first intraoral image and the second intraoral image using at least one of rigid registration and non-rigid registration. Here, the registration image may be an image in which the corresponding bracket 1227 and the bracket 1217 overlap each other as shown in FIG. 12. For example, to obtain the movement information of the bracket, the amount of change between a plurality of images representing the extracted bracket using various motion measurement techniques such as optical flow, feature matching, and similarity measurement is measured, and by using the measured amount of change, an image indicating the movement of the bracket, which is a registration image, may be acquired.

Alternatively, by comparing each of the extracted brackets, it is possible to measure the amount of movement of each bracket. For example, the amount of movement between the bracket 1228 extracted from the first intraoral image 1225 and the bracket 1218 extracted from the corresponding second intraoral image 1215 may be obtained. In addition, the amount of movement between the bracket 1227 extracted from the first intraoral image 1225 and the bracket 1217 extracted from the corresponding second intraoral image 1215 may be obtained. That is, it is possible to obtain the movement amount of each of the corresponding brackets.

Accordingly, the processor 410 may display the extracted movement of the bracket as in the third intraoral image (e.g., the third intraoral image 1235 shown in FIG. 12) based on the movement information of the bracket. Specifically, the bracket corresponding to the first time point and the bracket corresponding to the second time point may be displayed overlapping each other.

Specifically, the third image may be an image indicating the movement of at least one bracket from the above-described first time point to the second time point on the intraoral image scanned at any one of the current time point, the first time point, the second time point, or a preset time point before the present.

As the orthodontic treatment progresses, the teeth to which the brackets are attached move, and accordingly, the wire connecting the brackets also moves. That is, the positions of the brackets, the teeth to which the brackets are attached, and the wires at the first time point and the positions of the brackets, the teeth to which the brackets are attached, and the wires at the second time point may be different from each other.

In the disclosed embodiment, a third intraoral image may be generated to show the movement of the bracket without showing the movement of the teeth and wire so that the user may more clearly grasp the movement of the bracket.

For example, the third intraoral image 1235 may be an image generated by overlapping at least one bracket (e.g., 1227 or 1228) extracted from the first intraoral image 1225 on the second intraoral image 1215. In detail, the teeth 1201 and 1202 may represent teeth scanned at a second time point that is the most recent time point among the first time point and the second time point. In FIG. 12, a wire displayed on the third intraoral image 1235 may represent a wire scanned at a second time point. That is, in the example of the third intraoral image 1235 shown in FIG. 12, the movement of the wire from the first time point to the second time point is not indicated.

In addition, unlike in the example of the third intraoral image 1235 shown in FIG. 12, the third intraoral image may be an image in which at least one of a tooth and a wire at each of the first time point and the second time point is displayed in an overlapping manner so that the third intraoral image may represent the movement of the bracket, and even the movement of at least one of the tooth to which the bracket is attached and the wire connecting the bracket.

Also, unlike in the example of the third intraoral image 1235 shown in FIG. 12, the wire may not be imaged in the third intraoral image.

Hereinafter, for convenience of explanation, a case in which the third intraoral image displays the brackets extracted from the first intraoral image overlapped on the second intraoral image obtained by scanning the intraoral cavity of the patient at the second time point, and represents the movement of the bracket from the first time point to the second time point will be described and illustrated as an example. In addition, on the third intraoral image, only the wire connecting the bracket extracted at the second time point is displayed, and the wire connecting the bracket extracted at the first time point is not displayed as an example.

Specifically, in the third intraoral image 1235, the bracket extracted from the first intraoral image 1225 and the bracket extracted from the second intraoral image 1215 may be displayed to be distinguished from each other.

Specifically, the bracket extracted from the first intraoral image 1225 and the bracket extracted from the second intraoral image 1215 may be displayed to be distinguished from each other using at least one of different colors, transparency, patterns, symbols, shapes, and text.

In the third intraoral image 1235 shown in FIG. 12, the bracket extracted from the first intraoral image 1225 is illustrated using a dotted line, and the bracket extracted from the second intraoral image 1215 is illustrated using a solid line. In addition, the user interface screen (not shown) including the third intraoral image 1235 may include information describing that the bracket extracted from the first intraoral image 1225 is indicated by a dotted line, and the bracket extracted from the second intraoral image 1215 is indicated by a solid line.

As described above, the third intraoral image 1235 can be an image displayed superimposed so that the bracket extracted from the first intraoral image 1225 and the bracket extracted from the second intraoral image 1215 are mutually distinguished, so that the user may more intuitively recognize the movement of the bracket during the time between the first time point and the second time point by looking at the third intraoral image 1235. Accordingly, the user performing orthodontic treatment may more conveniently perform orthodontic treatment by referring to the third intraoral image 1235 in the previous orthodontic process and the future orthodontic process.

Also, in the third intraoral image 1235, brackets extracted from the second intraoral image 1215 and a wire for connecting them can be also shown. However, the processor 410 may be able to control that only the brackets are imaged without the wire being imaged in the third intraoral image 1235. In each of the third intraoral images shown in FIGS. 13 to 20 below, a case in which a wire is imaged together with a bracket is illustrated as an example.

The third intraoral image (e.g., 1235 in FIG. 12) will be described in detail below with reference to FIGS. 13 to 20. Referring to FIGS. 13 to 20, the same components are shown using the same reference numerals.

In the disclosed embodiment, the third intraoral image may be an intraoral image in which information indicating at least one of a distance, a movement direction, a position difference, a movement time, and a movement speed corresponding to the movement of each of the at least one bracket attached to the at least one tooth from the first time point to the second time point is displayed.

Figure 13:
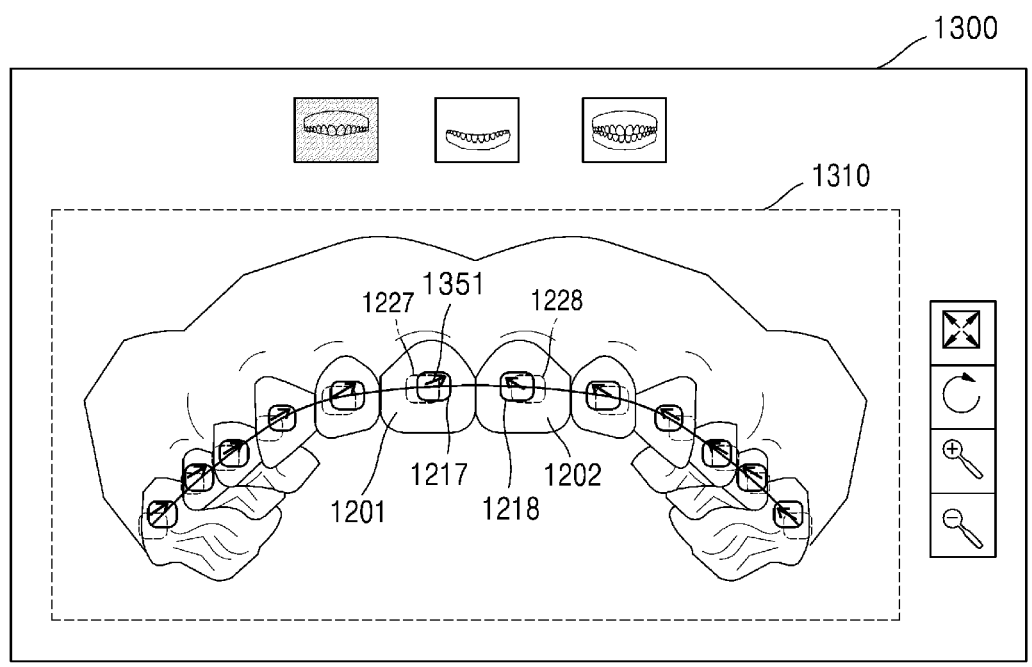
FIG. 13 is a diagram illustrating an example of a user interface screen output according to the disclosed embodiment.

FIG. 13 is a diagram illustrating an example of a user interface screen output according to the disclosed embodiment. In the disclosed embodiment, the processor 410 may output the user interface screen 1300 including the third intraoral image 1310. In the third intraoral image 1310 illustrated in FIG. 13, the same components as those of the intraoral image 1235 of FIG. 12 are illustrated using the same reference numerals, and thus a redundant description will be omitted.

Referring to FIG. 13, in the third intraoral image 1310, an arrow 1351 indicating the movement from the bracket (e.g., 1227) extracted from the first intraoral image 1225 to the bracket (e.g., 1217) extracted from the second intraoral image 1215 is shown. Here, the arrow 1351 may indicate a movement distance and a movement direction between the corresponding brackets (e.g., 1217 and 1227). That is, the length of the arrow 1351 may correspond to the moving distance between the corresponding brackets 1217 and 1227, and the direction of the arrow 1351 may correspond to the moving direction between the corresponding brackets 1217 and 1227. For example, when the moving distance between the brackets 1217 and 1227 is long, the length of the displayed arrow increases, and when the moving direction between the corresponding brackets 1217 and 1227 is southwest, the moving direction of the arrow 1351 may be displayed toward the southwest.

In addition, to indicate the movement of the extracted bracket (e.g., 1217), instead of the arrow 1351, a marker, figure, or mark that may indicate the movement direction and movement distance of the bracket may be used.

In addition, in the description of operations S310 and S320 of FIG. 3, there is a case in which an intraoral image is obtained and used at each of three or more different time points.

Specifically, when an intraoral image is acquired at each of the first time point, the second time point, and the third time point subsequent to the second time point, a bracket may be extracted from each intraoral image corresponding to each of the above-described first time point, second time point, and third time point (S330). And, based on the at least one bracket extracted from the first intraoral image, the at least one bracket extracted from the second intraoral image, and the at least one bracket extracted from the intraoral image of third time point, bracket movement information may be obtained (S340). Then, based on the movement information, a user interface screen including a third intraoral image indicating movement or transfer of at least one bracket during a time interval including a first time point, a second time point, and a third time point may be displayed.

Specifically, in a plurality of three or more time points, it is possible to obtain the movement information of the bracket that occurs between two time points adjacent in time, respectively. For example, if the above-described three time points exist, movement information of the bracket between the first time point and the second time point (hereinafter, 'first movement information'), and movement information between the second time point and the third time point (hereinafter, 'second movement information') are each obtained and based on the first movement information and the second movement information, it is possible to generate a third intraoral image that represents both movement of the bracket between the first time point and the second time point (hereinafter, 'first movement') and the movement of the bracket between the second time point and the third time point (hereinafter, 'second movement'). In this case, on the third intraoral image (not shown), the arrow indicating the first movement and the arrow indicating the second movement may be displayed simultaneously or sequentially, respectively. For example, a third intraoral image (not shown) in which both an arrow indicating a first movement and an arrow indicating a second movement are displayed may be generated. Alternatively, the third intraoral image may be generated in such a way that arrows indicating the first movement are first displayed on the third intraoral image, and then arrows indicating the second movement are sequentially or continuously displayed. The sequential or continuous display of the arrow indicating the first movement and the arrow indicating the second movement may be displayed by applying an animation effect or by applying a motion effect.

As in the third intraoral image 1310 shown in FIG. 13, if the movement between the brackets 1217 and 1227 corresponding to each other is indicated by an arrow indicating the movement distance and the movement direction, a user, such as a dentist, may more intuitively recognize the movement of the bracket in the orthodontic treatment process.

Figure 14:
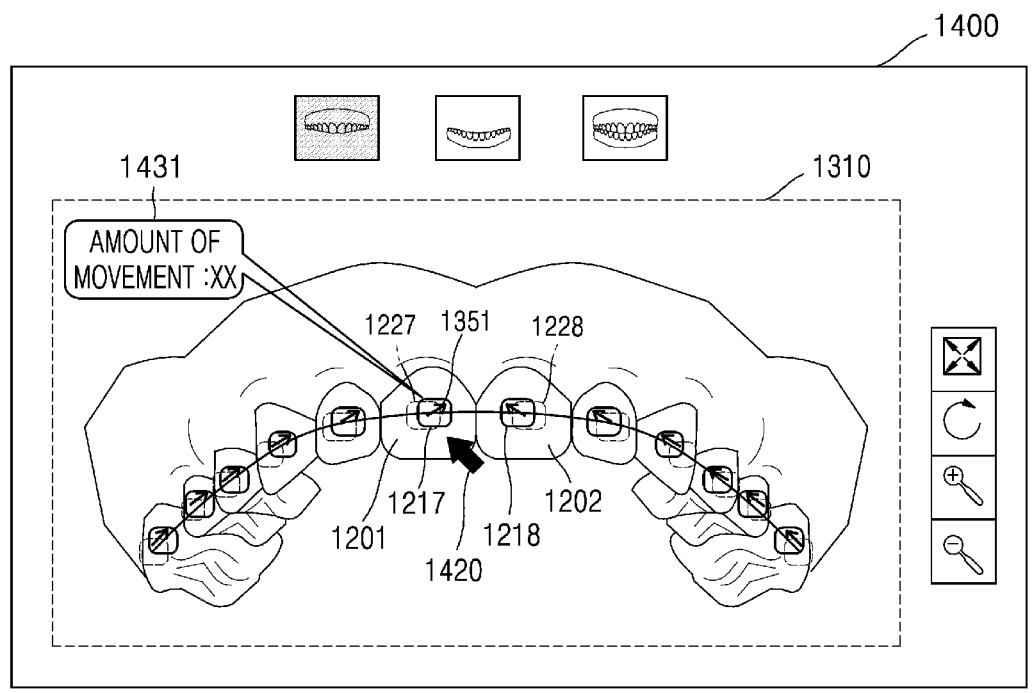
FIG. 14 is a diagram illustrating another example of a user interface screen output in the disclosed embodiment.

FIG. 14 is a diagram illustrating another example of a user interface screen output according to the disclosed embodiment. In the disclosed embodiment, the processor 410 may output the user interface screen 1400 including the third intraoral image 1410. The third intraoral image 1410 corresponds to the third intraoral image 1310, and may further include information (e.g., 1431) specifically indicating a movement amount compared to the third intraoral image 1310. For example, the information 1431 may include at least one of a movement distance, a movement direction, a movement vector, a movement speed, and a movement time of an object (e.g., a bracket) that is a movement measurement target.

As described above, when each of the first intraoral image and the second intraoral image is a three-dimensional model of the intraoral cavity representing the scanned intraoral cavity in three dimensions, both of the bracket extracted from the first intraoral image and the bracket extracted from the second intraoral image may include information on three-dimensional coordinate values. Therefore, when the movement information of the bracket is obtained based on the bracket extracted from the first intraoral image and the bracket extracted from the second intraoral image, the amount of movement of the bracket in each of the X, Y, and Z directions on the three-dimensional coordinates may be obtained.

The processor 410 may control information (e.g., 1431) specifically indicating the movement amount of the bracket to be displayed on the user interface screen 1400 based on the movement amount on the three-dimensional coordinates. Here, information (e.g., 1431) specifically indicating the movement amount of the bracket may be a value corresponding to each of the X, Y, and Z directions on the three-dimensional coordinates. For example, the movement amount of the bracket attached to the 11th tooth 1201 may be expressed as (x2-x1, y2-y1, z2-z1), and the information (e.g., 1431) may be displayed in the form of a pop-up message such as "movement amount: (x2-x1, y2-y1, z2-z1)". Here, (x1, y1, z1) may be coordinate information of the bracket 1227 at the first time point, and (x2, y2, z2) may be coordinate information of the bracket 1217 at the second time point.

In FIG. 14, information indicating the movement amount of the bracket (e.g., 1431) may be displayed for the bracket selected by the user. For example, when the user points to the 11th tooth 1201 and the 21st tooth 1202 using the pointer 1420 or the like, information (e.g., 1431) indicating the amount of movement of the bracket may be provided for at least one tooth adjacent to the position of the pointer 1420.

In addition, when a plurality of brackets are imaged within a certain radius where the pointer 1420 is located, it will be possible to display the movement amount information of the bracket corresponding to each of the plurality of brackets imaged within a certain radius.

In addition, information indicating the amount of movement of the bracket, regardless of the position of the pointer 1420, may be generated and displayed for each of the brackets.

Figure 15:
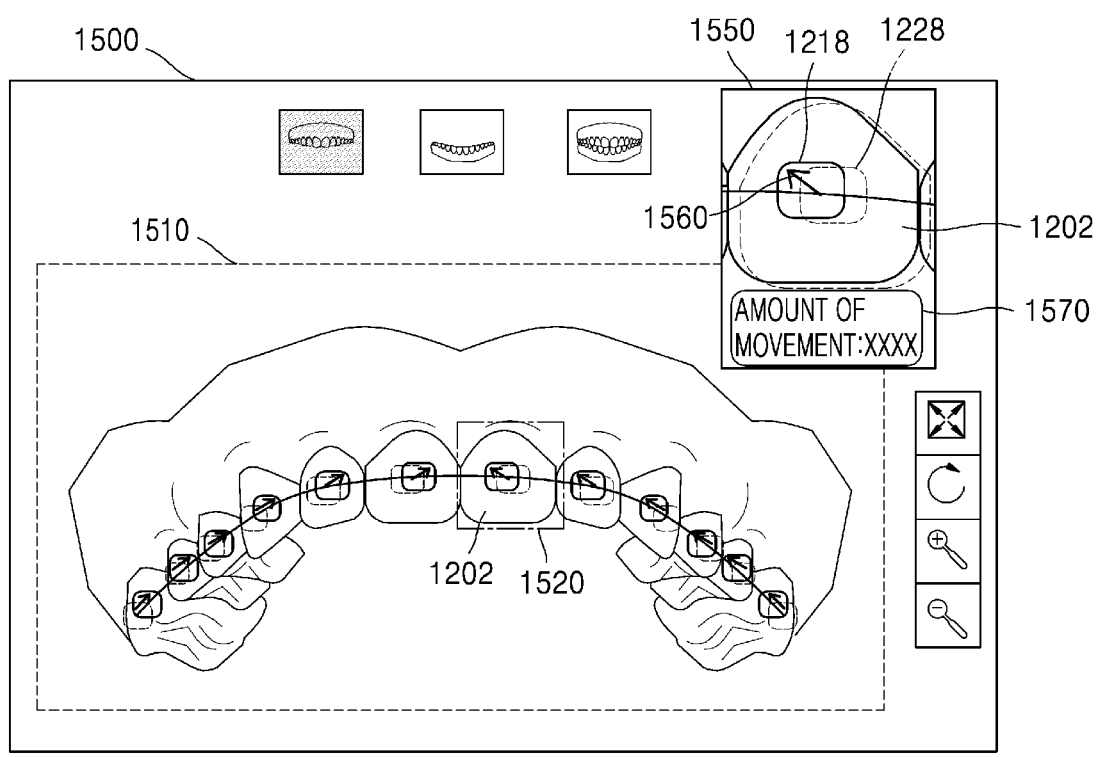
FIG. 15 is a diagram illustrating another example of a user interface screen output according to the disclosed embodiment.

FIG. 15 is a diagram illustrating another example of a user interface screen output according to the disclosed embodiment. In the disclosed embodiment, the processor 410 may output the user interface screen 1500 including the third intraoral image 1510.

Referring to FIG. 15, when a preset region 1520 on the third intraoral image 1510 is selected, the processor 410 may control to display a sub-screen 1550 displayed by magnifying the preset region 1520.

Specifically, when the user sets the region of interest 1520 including the 21st tooth 1202, a sub-screen 1550 on which the set region of interest 1520 is enlarged and displayed may be included and displayed on the user interface screen 1500.

Here, the sub screen 1550 may further include the arrow 1560 described with reference to FIG. 13 and information 1570 specifically indicating the amount of movement of the bracket described with reference to FIG. 14 so that the movement between the bracket (e.g., 1228) extracted from the first intraoral image 1225 and the bracket (e.g., 1218) extracted from the second intraoral image 1215 is more clearly shown.

In addition, in selecting a preset region to be displayed on the sub screen 1550, the case of selecting the region of interest 1520 is illustrated and described with reference to FIG. 15 as an example. In this regard, a preset region to be displayed on the sub screen 1550 may be selected using the pointer 1420 described with reference to FIG. 14. For example, when a point on the tooth 1202 is selected with the pointer 1420, a region of interest 1520 having a preset size based on the point may be automatically selected.

Figure 16:
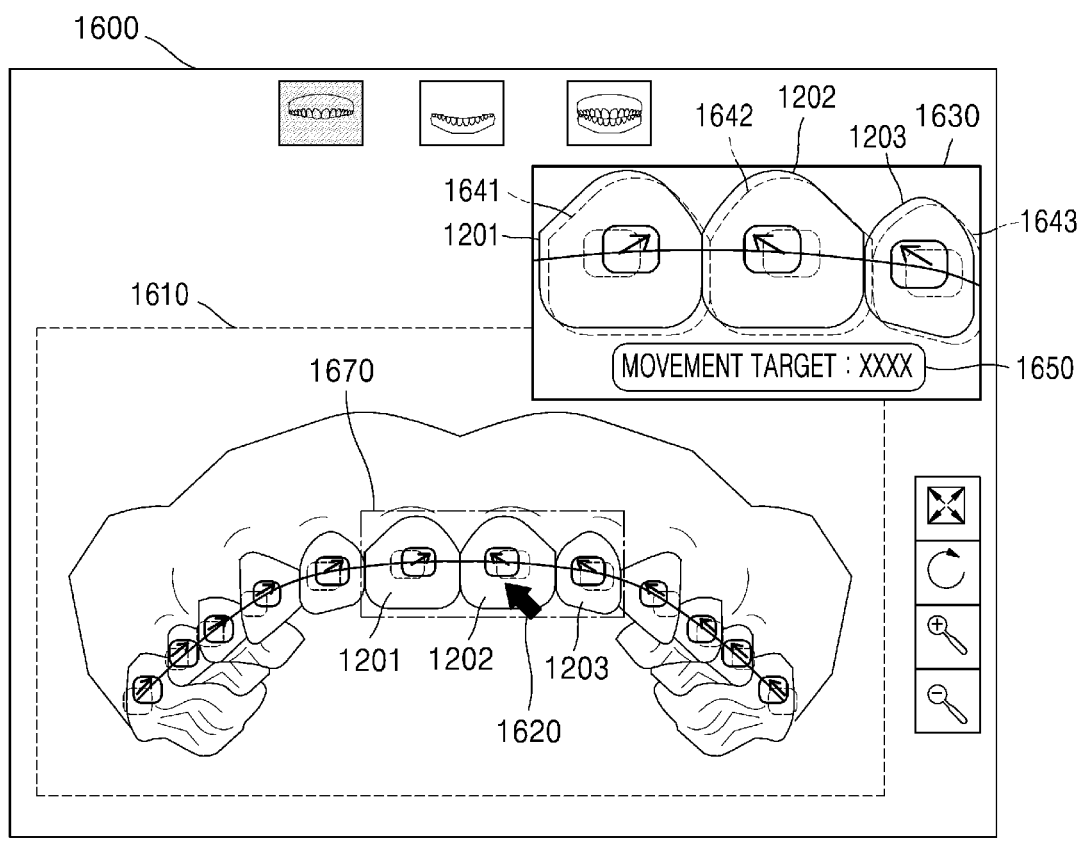
FIG. 16 is a diagram illustrating an example of a user interface screen output according to the disclosed embodiment.

FIG. 16 is a diagram illustrating an example of a user interface screen output according to the disclosed embodiment. In the disclosed embodiment, the processor 410 may output the user interface screen 1600 including the third intraoral image 1610.

Referring to FIG. 16, the processor 410 may control information 1630 (hereinafter, 'guide information') for guiding the final target position for at least one tooth corrected by at least one bracket to be included and displayed on the user interface screen 1600.

Specifically, the guide information 1630 may be generated to correspond to the tooth selected by the pointer 1620. Specifically, the guide information 1630 may include information indicating the final movement target of the tooth selected by the pointer 1620. In addition, the guide information 1630 may superimpose a virtual tooth 1642 in a final target position with respect to the tooth 1202 scanned at the second time point, and may include a target movement amount 1650 necessary to move to the final target position.

As described with reference to FIG. 16, when the user interface screen 1600 including the guide information 1630 for guiding the final target position is output, the user may refer to the guide information 1630 to perform subsequent orthodontic treatment more conveniently and easily.

Figure 17:
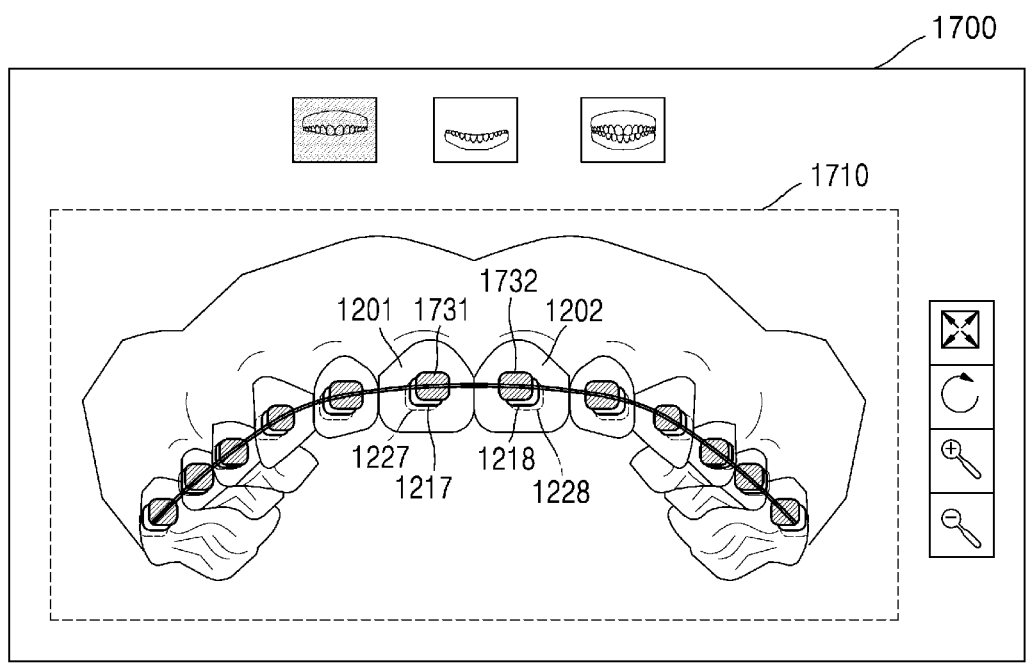
FIG. 17 is a diagram illustrating another example of a user interface screen output according to the disclosed embodiment.

FIG. 17 is a diagram illustrating another example of a user interface screen output according to the disclosed embodiment. In the disclosed embodiment, the processor 410 may output the user interface screen 1700 including the third intraoral image 1710. In the third intraoral image 1710 illustrated in FIG. 17, the same components as those of the intraoral image 1235 of FIG. 12 are illustrated using the same reference numerals, and thus a redundant description will be omitted.

In the disclosed embodiment, the third intraoral image 1710 shown in FIG. 17 corresponds to the third intraoral image 1235 shown in FIG. 12, and in addition to the third intraoral image 1235, the final target position of at least one bracket may be additionally displayed.

Referring to FIG. 17, regarding the 21st tooth 1202, the bracket 1228 corresponding to the first time point and the bracket 1218 corresponding to the second time point are displayed overlappingly, so that movement of the at least one bracket is shown during the second time point from the first time point. In addition to this, the final target position 1732 of the bracket intended for orthodontic treatment may be additionally displayed. Here, the final target position 1732 of the bracket may be displayed using at least one of different colors, transparency, patterns, symbols, figures, and texts to be distinguished from the bracket 1228 corresponding to the first time point and the bracket 1218 corresponding to the second time point. Here, the text may include text such as, for example, "the final target position 1732 is the final target position of the bracket for orthodontic treatment".

In the example shown in FIG. 17, the bracket 1228 corresponding to the first time point is indicated by a dotted line, the bracket 1218 corresponding to the second time point is indicated by a solid line, and the final target position 1732 of the bracket is indicated by an oblique line so that they are marked to distinguish them from each other.

When the third intraoral image 1710 according to the disclosed embodiment is provided to the user, the user may more intuitively grasp the history of orthodontic treatment up to now and the final target position 1732 of the bracket. Accordingly, the user may accurately diagnose the degree of orthodontic treatment and perform subsequent orthodontic treatment.

Figure 18:
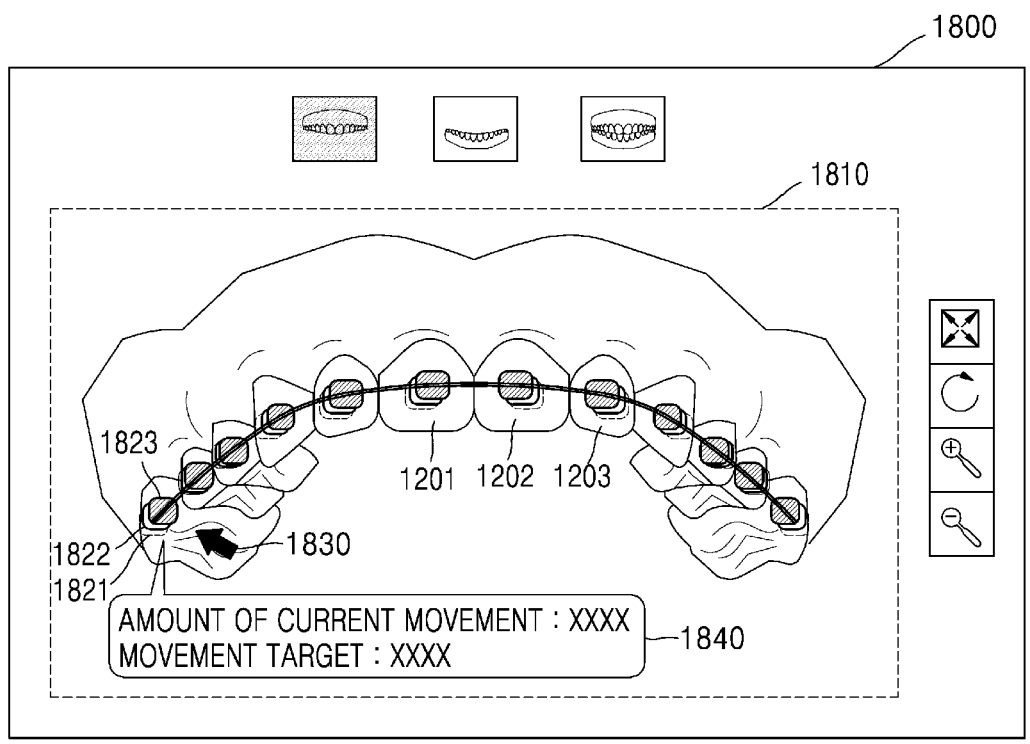
FIG. 18 is a diagram illustrating another example of a user interface screen output according to the disclosed embodiment.

FIG. 18 is a diagram illustrating another example of a user interface screen output according to the disclosed embodiment. In the disclosed embodiment, the processor 410 may output the user interface screen 1800 including the third intraoral image 1810. In the third intraoral image 1810 shown in FIG. 18, the same components as those of the third intraoral image 1710 shown in FIG. 17 are illustrated using the same reference numerals, and thus a redundant description will be omitted.

In the disclosed embodiment, the third intraoral image 1810 shown in FIG. 18 corresponds to the third intraoral image 1710 shown in FIG. 17, and in addition to the third intraoral image 1710 shown in FIG. 17, a window 1840 indicating at least one of information indicating the amount of movement of the bracket up to now and information indicating the amount of remaining movement to the target position may be additionally displayed. Here, the amount of movement up to now indicates the amount of movement between the bracket 1821 corresponding to the first time point and the bracket 1822 corresponding to the second time point, and may correspond to information (e.g., 1431) described in FIG. 14. And, the amount of remaining movement may represent a movement amount between the position of the bracket 1822 at the second time point corresponding to the present and the final target position 1823 of the bracket.

Also, the window 1840 may be displayed for the bracket selected to by the user. For example, when the user points to the rightmost tooth of the upper jaw using the pointer 1820 or the like, a window 1840 corresponding to the pointed tooth may be provided.

Figure 19:
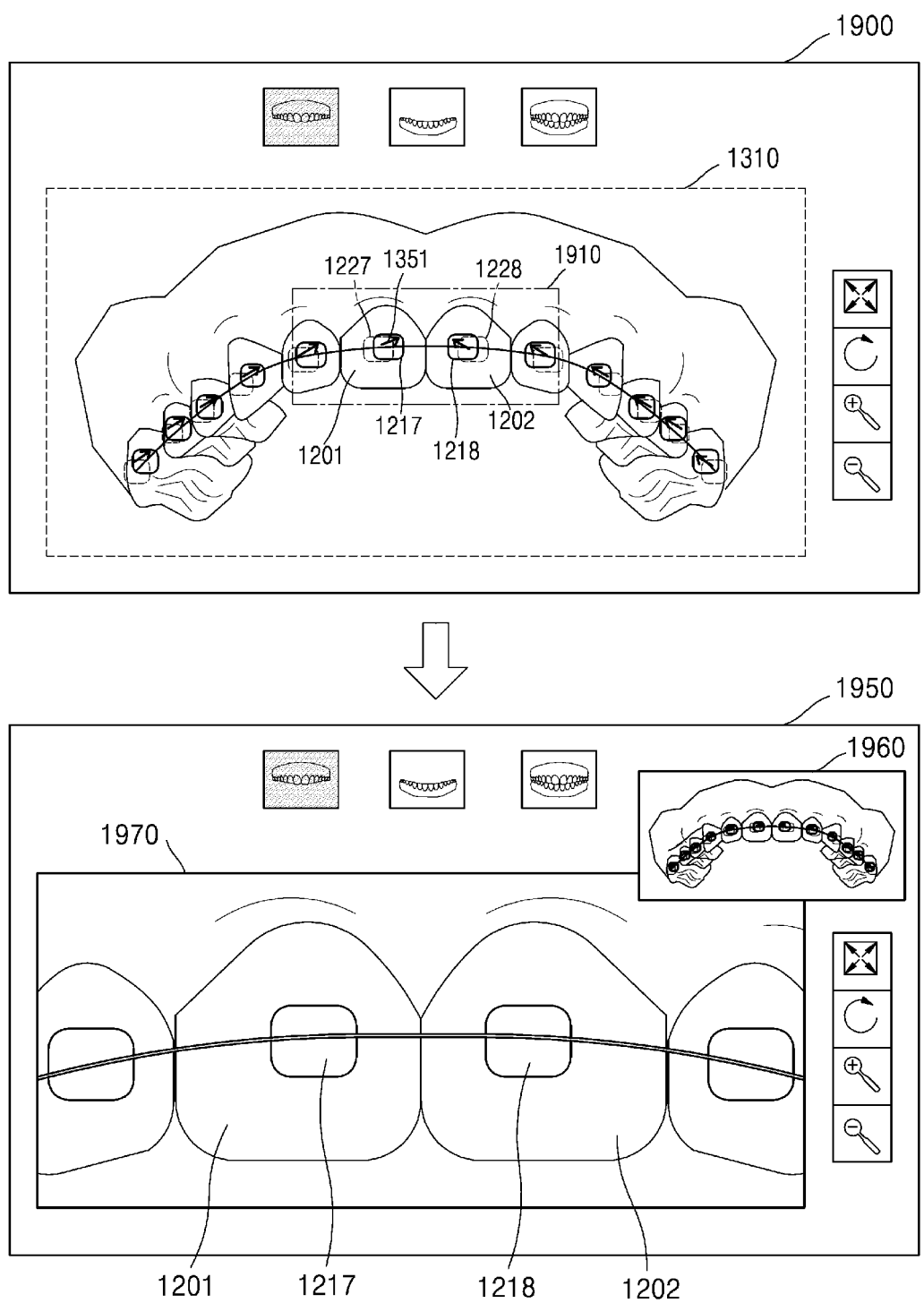
FIG. 19 is a diagram illustrating another example of a user interface screen output in the disclosed embodiment.

FIG. 19 is a diagram illustrating another example of a user interface screen output according to the disclosed embodiment. In the disclosed embodiment, the processor 410 may output the user interface screen 1900 including the third intraoral image 1310. Since the third intraoral image 1310 included in the user interface screen 1900 is the same as the third intraoral image 1310 included in the user interface screen 1300 of FIG. 13, the same reference symbols are used.

Referring to FIG. 19, when the user interface screen 1900 is output through the display 430, the processor 410 may receive a user input for selecting a preset region 1910 on the third intraoral image 1310. Here, the user input may be received through the user interface 450 described with reference to FIG. 5 and then transmitted to the processor 410.

The preset region 1910 illustrated in FIG. 19 may be referred to as a region of interest. Since the configuration for selecting the region of interest has been described in detail with reference to FIG. 15, a detailed description thereof will be omitted.

Referring to FIG. 19, the processor 410 may control the user interface screen 1900 including the third intraoral image 1310 to be output. Subsequently, when a user input for selecting the preset region 1910 is received, the user interface screen may be controlled to be switched as illustrated. Specifically, in response to receiving a user input for selecting a preset region 1910, the display 430 that has output the user interface screen 1900 may switch the screen so that the user interface screen 1950 is output according to the control of the processor 410.

Specifically, when a user input for selecting a preset region 1910 is received, the intraoral image corresponding to the selected preset region 1910 is displayed in the main screen 1970 in the changed user interface screen 1950, and the third intraoral image 1310 that was displayed as the main screen in the user interface screen 1900 before the change may be displayed in the sub screen 1960 in the changed user interface screen 1950.

Here, the image displayed as the main screen 1970 in the changed user interface screen 1950 may be any one of a first intraoral image corresponding to the preset region 1910, a second intraoral image corresponding to the preset region 1910, or a third image corresponding to the preset region 1910. In FIG. 19, a case in which the second intraoral image corresponding to the preset region 1910 is displayed on the main screen 1970 in the changed user interface screen 1950 is illustrated as an example.

In addition, the processor 410 may control the first intraoral image corresponding to the preset region 1910 and the second intraoral image corresponding to the preset region 1910 to be sequentially switched and output to the main screen 1970 in the changed user interface screen 1950. That is, after the first intraoral image corresponding to the preset region 1910 is displayed for a preset time (e.g., 5 seconds, etc.), the processor 410 may control the second intraoral image corresponding to the preset region 1910 to be displayed for a preset time (e.g., 5 seconds, etc.) on the main screen 1970 in the changed user interface screen 1950.

In addition, the processor 410 may control the first intraoral image corresponding to the preset region 1910, the second intraoral image corresponding to the preset region 1910, and the third image corresponding to the preset region 1910 to be sequentially switched and output to the main screen 1970 in the changed user interface screen 1950.

The region of interest is generally set/selected by the user for precise diagnosis. Accordingly, when the region of interest is enlarged and displayed on the main screen on the user interface screen as shown in FIG. 19, the user may more conveniently view the intraoral image corresponding to the region of interest. Accordingly, it is possible to increase user convenience.

Figure 20:
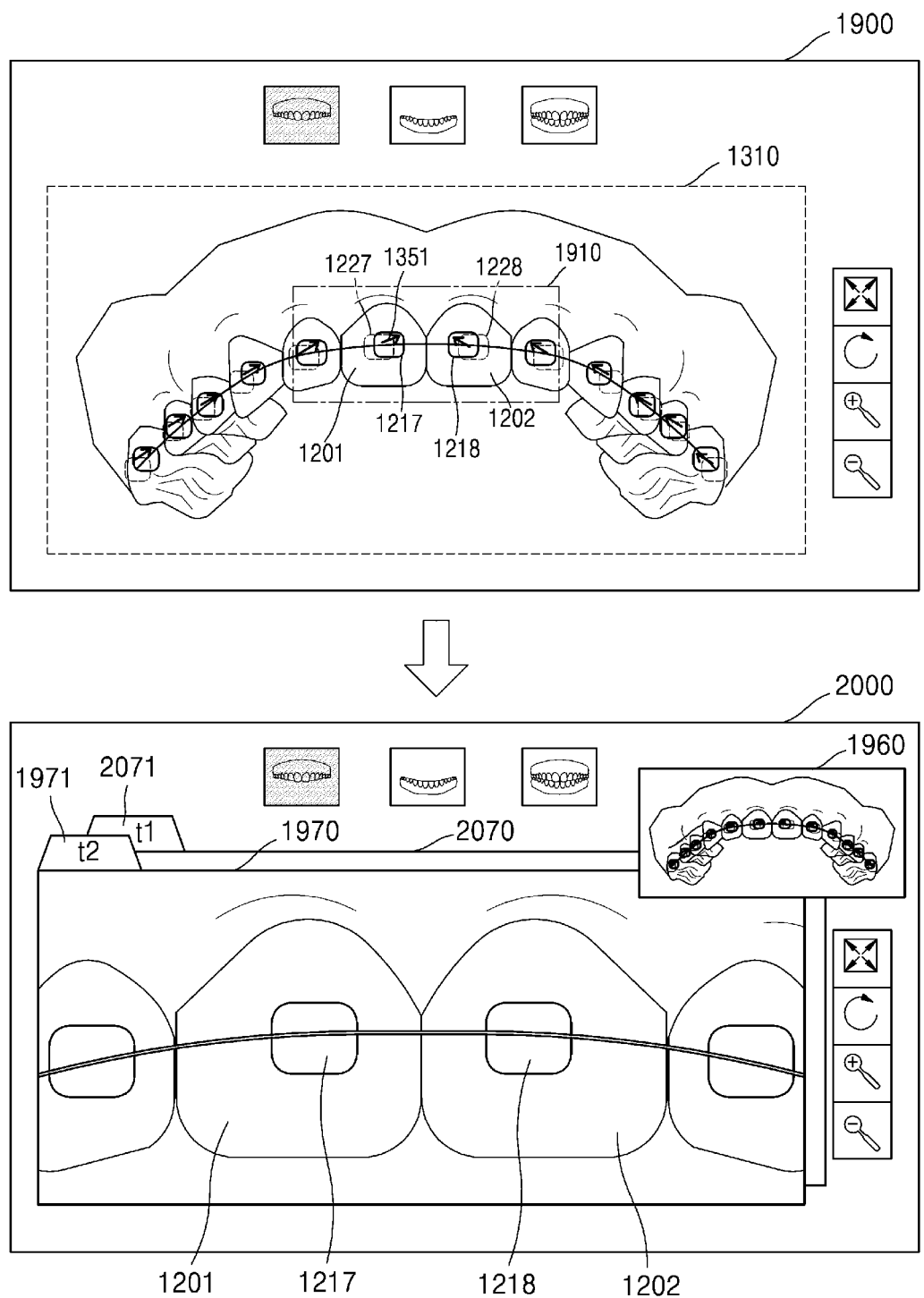
FIG. 20 is a diagram illustrating another example of a user interface screen output in the disclosed embodiment.

FIG. 20 is a diagram illustrating another example of a user interface screen output according to the disclosed embodiment. In FIG. 20, the same components as those shown in FIG. 19 are illustrated using the same reference numerals.

Referring to FIG. 20, the processor 410 may control the user interface screen 1900 including the third intraoral image 1310 to be output. Subsequently, when a user input for selecting the preset region 1910 is received, the processor 410 may control the user interface screen to be switched as illustrated. Specifically, in response to receiving a user input for selecting a preset region 1910, the display 430 that has output the user interface screen 1900 may switch the screen so that the user interface screen 2000 is output according to the control of the processor 410.

Specifically, when a user input for selecting a preset region 1910 is received, the intraoral image corresponding to the selected preset region 1910 is displayed in the main screen 1970 in the changed user interface screen 2000, and the third intraoral image 1310 that was displayed as the main screen in the user interface screen 1900 before the change may be displayed in the sub screen 1960 in the changed user interface screen 2000.

Referring to FIG. 20, at least one of a first intraoral image corresponding to the preset region 1910, a second intraoral image corresponding to the preset region 1910, and a third image corresponding to the preset region 1910 may be displayed with a multi-layered structure in the main screen 1970 in the changed user interface screen 2000. For example, the second intraoral image corresponding to the preset region 1910 is displayed on the front main screen 1970, and the back main screen 2070 including the first intraoral image corresponding to the preset region 1910 may be displayed behind the main screen 1970.

In addition, a marker 1971 indicating the scan at the second time point may be displayed on the main screen 1970 including the second intraoral image corresponding to the preset region 1910. For example, the marker 1971 may include text information indicating that it is a scan at the second time point. In addition, a marker 2071 indicating the scan at the first time point may be displayed on the back main screen 2070 including the first intraoral image corresponding to the preset region 1910.

In FIG. 20, a case in which the first intraoral image scanned at time point t1 is displayed on a back main screen 2070 and the second intraoral image scanned at time point t2 is displayed on the front main screen 1970 is shown as an example, but the order and type of images displayed on the main screen may be changed.

In this case, when the user inputs a user input for selecting the marker 2071, the processor 410 may control to display the first intraoral image corresponding to the marker 2071 on the front main screen in response to the user input.

The intraoral image processing method according to an embodiment of the present disclosure may be implemented in the form of program instructions that may be executed through various computer means and recorded in a computer-readable medium. Also, an embodiment of the present disclosure may be a computer-readable storage medium in which one or more programs including at least one instruction for executing an intraoral image processing method are recorded.

The computer-readable storage medium may include program instructions, data files, data structures, etc. alone or in combination. Here, examples of computer-readable storage media may include hardware devices configured to store and execute program instructions, for example, magnetic media such as hard disks, floppy disks and magnetic tapes, optical media such as CD-ROM and DVD, magneto-optical media such as a floptical disk, and ROM, RAM, flash memory, etc.

Here, the device-readable storage medium may be provided in the form of a non-transitory storage medium. Here, the 'non-transitory storage medium' may refer to that the storage medium is a tangible device. Also, the 'non-transitory storage medium' may include a buffer in which data is temporarily stored.

According to one embodiment, the intraoral image processing method according to various embodiments disclosed herein may be included in a computer program product and provided. The computer program product may be distributed in the form of a machine-readable storage medium (e.g., compact disc read only memory (CD-ROM)). Alternatively, the computer program produce may be distributed online (e.g., downloaded or uploaded) through an application store (e.g., play store, etc.) or directly between two user devices (e.g., smartphones). Specifically, the computer program product according to the disclosed embodiment may include a storage medium in which a program including at least one instruction to perform the intraoral image processing method according to the disclosed embodiment is recorded.

Although the embodiments of the inventive concept have been described in detail above, the scope of the inventive concept is not limited thereto, and various modifications and improvements of those skilled in the art using the basic concept of the inventive concept defined in the following claims also belong to the scope of the inventive concept.

The invention claimed is:

1. An intraoral image processing method comprising:
   acquiring a first intraoral image generated by scanning, at a first time point, at least one tooth to which at least one orthodontic device is attached;
   acquiring a second intraoral image generated by scanning, at a second time point subsequent to the first time point, the at least one tooth to which the at least one orthodontic device is attached;
   extracting an image of at least one orthodontic device from each of the first intraoral image and the second intraoral image;
   obtaining movement information of an orthodontic device based on the image of the at least one orthodontic device extracted from the first intraoral image and the image of at least one orthodontic device extracted from the second intraoral image; and
   generating a third intraoral image representing a movement of at least one orthodontic device from the first time point to the second time point based on the movement information,
   wherein the third intraoral image is an image on which a final target position of the at least one orthodontic device is displayed.

2. The method of claim 1, wherein the third intraoral image is an intraoral image on which information indicating at least one of a movement distance, a movement direction, a position difference, a movement time, and a movement speed corresponding to a movement of each of the at least one orthodontic device from the first time point to the second time point is displayed.

3. The method of claim 1, wherein the third intraoral image is an intraoral image on which image of the at least one orthodontic device extracted from the first intraoral image and the image of the at least one orthodontic device extracted from the second intraoral image are displayed to be distinguished from each other based on the movement information.

4. The method of claim 1, wherein the third intraoral image is an intraoral image on which the image of the at least one orthodontic device extracted from the first intraoral image and the image of the at least one orthodontic device extracted from the second intraoral image are displayed to be distinguished from each other using at least one of different colors, different transparency, different patterns, different symbols, different shapes, and different text.

5. The method of claim 1, wherein the third intraoral image is an image generated by overlapping the image of the at least one orthodontic device extracted from the first intraoral image on the second intraoral image.

6. The method of claim 1, further comprising:
   generating information for guiding the final target position of the at least one tooth to be corrected by the at least one orthodontic device; and
   outputting the information for guiding the final target position onto the third intraoral image.

7. The method of claim 1, wherein the extracting of the image of the at least one orthodontic device comprises:
inputting each of the first intraoral image and the second intraoral image to a neural network trained to extract an image of an orthodontic device; and
obtaining the image of at least one orthodontic device corresponding to the first intraoral image and the image of at least one orthodontic device corresponding to the second intraoral image, which are output from the neural network.

8. The method of claim 7, wherein the neural network is a deep neural network (DNN) that performs a convolution operation to separate an image of an orthodontic device by executing pixel-wise segmentation on an intraoral image.

9. The method of claim 1, wherein the obtaining of the movement information of the orthodontic device comprises:
replacing each of an image of at least one bracket extracted from the first intraoral image and an image of at least one bracket extracted from the second intraoral image with a library image corresponding to the image of the extracted bracket; and
acquiring movement information of the bracket based on the library image.

10. The method of claim 1, further comprising displaying a user interface screen including the third intraoral image.

11. The method of claim 1, wherein the orthodontic device comprises at least one of a bracket, an attachment, an orthodontic screw, a lingual orthodontic device, and a removable orthodontic retention device.

12. An intraoral diagnostic device comprising a processor for processing an intraoral image,
wherein the processor, by executing at least one instruction, is configured to obtain a first intraoral image generated by scanning, at a first time point, at least one tooth to which at least one orthodontic device is attached, acquiring a second intraoral image generated by scanning, at a second time point subsequent to the first time point, the at least one tooth to which the at least one orthodontic device is attached, extracting an image of at least one orthodontic device from each of the first intraoral image and the second intraoral image, obtaining movement information of an orthodontic device based on the image of the at least one orthodontic device extracted from the first intraoral image and the image of the at least one orthodontic device extracted from the second intraoral image, and generating a third intraoral image representing a movement of at least one orthodontic device during a time from the first time point to the second time point based on the movement information,
wherein the processor is further configured to control to display a final target position of the at least one orthodontic device on the third intraoral image.

13. The intraoral diagnostic device of claim 12, wherein the processor is further configured to control to generate the third intraoral image on which information indicating at least one of a movement distance, a movement direction, a position difference, a movement time, and a movement speed corresponding to a movement of each of the at least one orthodontic device is displayed during the first time point to the second time point.

14. The intraoral diagnostic device of claim 12, wherein the processor is further configured to control to generate the third intraoral image on which the image of the at least one orthodontic device extracted from the first intraoral image and the image of the at least one orthodontic device extracted from the second intraoral image are displayed to be distinguished from each other based on the movement information.

15. The intraoral diagnostic device of claim 12, wherein the processor is further configured to control to generate the third intraoral image on which the image of the at least one orthodontic device extracted from the first intraoral image and the image of the at least one orthodontic device extracted from the second intraoral image are displayed to be distinguished from each other using at least one of different colors, different transparency, different patterns, symbols, different shapes, and different text.

16. The intraoral diagnostic device of claim 12, wherein the processor is further configured to control to generate a user interface screen including information for guiding a final target position of the at least one tooth to be corrected by the at least one orthodontic device.

17. The intraoral diagnostic device of claim 12, wherein the processor is further configured to input each of the first intraoral image and the second intraoral image to a neural network trained to extract an image of an orthodontic device, and extract an image of the at least one orthodontic device corresponding to the first intraoral image and an image of at least one orthodontic device corresponding to the second intraoral image, which are output from the neural network.

18. A non-transitory computer-readable storage medium storing a program including at least one instruction to perform an intraoral image processing method,
wherein the intraoral image processing method comprises:
acquiring a first intraoral image generated by scanning, at a first time point, at least one tooth to which at least one orthodontic device is attached;
acquiring a second intraoral image generated by scanning, at a second time point subsequent to the first time point, the at least one tooth to which the at least one orthodontic device is attached;
extracting an image of at least one orthodontic device from each of the first intraoral image and the second intraoral image;
obtaining movement information of an orthodontic device based on the image of the at least one orthodontic device extracted from the first intraoral image and the image of the at least one orthodontic device extracted from the second intraoral image; and
generating a third intraoral image representing a movement of at least one orthodontic device from the first time point to the second time point based on the movement information,
wherein the third intraoral image is an image on which a final target position of the at least one orthodontic device is displayed.

* * * * *